United States Patent
Tseng et al.

(10) Patent No.: US 12,167,317 B2
(45) Date of Patent: Dec. 10, 2024

(54) METHOD AND USER EQUIPMENT FOR ACCESS CONTROL IN WIRELESS COMMUNICATION SYSTEM

(71) Applicant: SHARP KABUSHIKI KAISHA, Sakai (JP)

(72) Inventors: Yung-Lan Tseng, Taipei (TW); Hsin-Hsi Tsai, Taipei (TW); Heng-Li Chin, Taipei (TW); Mei-Ju Shih, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 486 days.

(21) Appl. No.: 17/469,138

(22) Filed: Sep. 8, 2021

(65) Prior Publication Data
US 2022/0078697 A1 Mar. 10, 2022

Related U.S. Application Data

(60) Provisional application No. 63/075,735, filed on Sep. 8, 2020.

(51) Int. Cl.
*H04W 48/06* (2009.01)
*H04W 72/21* (2023.01)
(Continued)

(52) U.S. Cl.
CPC ........... *H04W 48/06* (2013.01); *H04W 72/21* (2023.01); *H04W 72/23* (2023.01); *H04W 74/0833* (2013.01); *H04W 76/30* (2018.02)

(58) Field of Classification Search
CPC ..... H04W 48/06; H04W 72/21; H04W 72/23; H04W 74/0833; H04W 76/30
See application file for complete search history.

(56) References Cited

U.S. PATENT DOCUMENTS

2009/0092120 A1  4/2009 Goto et al.
2017/0311290 A1* 10/2017 Adjakple .............. H04W 76/18
(Continued)

FOREIGN PATENT DOCUMENTS

CN     106793170 A     5/2017
CN     109479238 A     3/2019
(Continued)

OTHER PUBLICATIONS

3GPP TS 38.304, "3rd Generation Partnership Project; Technical Specification Group Radio Access Network; NR; User Equipment (UE) procedures in Idle mode and RRC Inactive state (Release 16)", V16.1.0 (Jul. 2020).
(Continued)

*Primary Examiner* — Basil Ma
(74) *Attorney, Agent, or Firm* — ScienBiziP, P.C.

(57) ABSTRACT

A method and a UE for access control in a wireless communication system are provided. The method performed by a UE for access control includes while attempting to initiate an UL data transmission procedure with a serving cell during an RRC Inactive state of the UE, receiving a radio resource configuration from the serving cell and transmitting one or more UL packets to the serving cell based on the radio resource configuration when a plurality of conditions is fulfilled. The plurality of conditions includes, at least: an attempt to transmit UL data is not barred by the serving cell, and an amount of pending UL data to be transmitted is less than or equal to a data volume threshold.

20 Claims, 9 Drawing Sheets

(51) Int. Cl.
  *H04W 72/23* (2023.01)
  *H04W 74/0833* (2024.01)
  *H04W 76/30* (2018.01)

(56) References Cited

U.S. PATENT DOCUMENTS

| | | | |
|---|---|---|---|
| 2018/0139778 A1 | 5/2018 | Chou et al. | |
| 2019/0150177 A1 | 5/2019 | Chen et al. | |
| 2019/0297562 A1 | 9/2019 | Wei et al. | |
| 2019/0394808 A1 | 12/2019 | Lee et al. | |
| 2020/0221369 A1 | 7/2020 | Adjakple et al. | |
| 2022/0022276 A1* | 1/2022 | Shih | H04L 5/001 |

FOREIGN PATENT DOCUMENTS

| | | | |
|---|---|---|---|
| JP | 2020522962 A | 7/2020 | |
| WO | 2018/129394 A1 | 7/2018 | |
| WO | 2020067749 A1 | 4/2020 | |

OTHER PUBLICATIONS

3GPP TS 38.321, "3rd Generation Partnership Project; Technical Specification Group Radio Access Network; NR; Medium Access Control (MAC) protocol specification (Release 16)", V16.1.0 (Jul. 2020).

3GPP TS 38.214, "3rd Generation Partnership Project; Technical Specification Group Radio Access Network; NR; Physical layer procedures for data (Release 16)", V16.2.0 (Jun. 2020).

3GPP TS 24.501, "3rd Generation Partnership Project; Technical Specification Group Core Network and Terminals; Non-Access-Stratum (NAS) protocol for 5G System (5GS); Stage 3; (Release 16)", V16.5.1 (Jul. 2020).

3GPP TS 38.401, "3rd Generation Partnership Project; Technical Specification Group Radio Access Network; NG-RAN; Architecture description (Release 16)", V16.1.0 (Mar. 2020).

3GPP TS 24.368, "3rd Generation Partnership Project; Technical Specification Group Core Network and Terminals; Non-Access Stratum (NAS) configuration Management Object (MO) (Release 16)", V16.4.0 (Jun. 2020).

3GPP TS 31.102, "3rd Generation Partnership Project; Technical Specification Group Core Network and Terminals; Characteristics of the Universal Subscriber Identity Module (USIM) application (Release 16)", V16.4.0 (Jun. 2020).

3GPP TS 23.501, "3rd Generation Partnership Project; Technical Specification Group Services and System Aspects; System architecture for the 5G System (5GS); Stage 2 (Release 16)", V16.4.0 (Mar. 2020).

3GPP TS 24.301, "3rd Generation Partnership Project; Technical Specification Group Core Network and Terminals; Non-Access-Stratum (NAS) protocol for Evolved Packet System (EPS); Stage 3 (Release 16)", V16.5.1 (Jul. 2020).

3GPP TS 23.122, "3rd Generation Partnership Project; Technical Specification Group Core Network and Terminals; Non-Access-Stratum (NAS) functions related to Mobile Station (MS) in idle mode (Release 16)", V16.10.0 (Jun. 2021).

3GPP TS 38.331, "3rd Generation Partnership Project; Technical Specification Group Radio Access Network; NR; Radio Resource Control (RRC) protocol specification (Release 16)", V16.1.0 (Jul. 2020).

CMCC, "Basic procedure for data transmission in RRC inactive state", R2-2007433, 3GPP TSG-WG2 Meeting #111 electronic, Online, Aug. 17-28, 2020.

Vivo, "General Considerations on Small Data Transmission", R2-2006550, 3GPP TSG-RAN WG2 Meeting#111-electronic, E-Meeting, Aug. 17-28, 2020 (Aug. 7, 2020).

* cited by examiner

METHOD AND USER EQUIPMENT FOR ACCESS CONTROL IN WIRELESS COMMUNICATION SYSTEM

CROSS-REFERENCE TO RELATED APPLICATION(S)

The present application claims the benefit of and priority to U.S. Provisional Patent Application Ser. No. 63/075,735 (hereafter referred to as "the '735 provisional"), filed on Sep. 8, 2020, entitled "ACCESS CONTROL FOR PACKET TRANSMISSION OF UE IN RRC-INACTIVE STATE." The contents of the '735 provisional are hereby fully incorporated herein by reference for all purposes.

FIELD

The present disclosure generally relates to wireless communication, and more particularly, to a method and a user equipment (UE) for access control in a wireless communication system.

BACKGROUND

With the tremendous growth in the number of connected devices and the rapid increase in user/network traffic volume, various efforts have been made to improve different aspects of wireless communication for next-generation wireless communication system, such as fifth-generation (5G) New Radio (NR), by improving data rate, latency, reliability, and mobility.

The 5G NR system is designed to provide flexibility and configurability to optimize network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to a method and a UE for access control in a wireless communication system.

According to a first aspect of the present disclosure, a method performed by a UE for access control is provided. The method includes while attempting to initiate an uplink (UL) data transmission procedure with a serving cell during a Radio Resource Control (RRC) Inactive state of the UE, receiving a radio resource configuration from the serving cell and transmitting one or more UL packets to the serving cell based on the radio resource configuration when a plurality of conditions is fulfilled. The plurality of conditions includes, at least, an attempt to transmit UL data is not barred by the serving cell, and an amount of pending UL data to be transmitted is less than or equal to a data volume threshold.

In an implementation of the first aspect, the UL data transmission procedure is a random access (RA) procedure triggered by the UE based on the radio resource configuration.

In another implementation of the first aspect, the UL data transmission procedure includes accessing at least one UL-Configured Grant (UL-CG) based on a UL-CG configuration pre-configured by the serving cell via UE-specific control signaling.

Another implementation of the first aspect further includes determining whether to access the at least one UL-CG for the UL data transmission procedure based on the data volume threshold; and determining whether to initiate a Random Access (RA) procedure for the UL data transmission procedure based on the data volume threshold.

In an implementation of the first aspect, the attempt to transmit the UL data is barred in a case that the UE receives, from the serving cell, system information comprising a cell-barred bit that indicates the serving cell is barred; or the serving cell is barred (by the UE) for SDT procedure during a barring time period determined by the UE based on a result of a unified access control (UAC) mechanism.

In an implementation of the first aspect, the UAC mechanism is implemented by the UE for the UL data transmission procedure based on an access category associated with the UL data transmission procedure.

Another implementation of the first aspect further includes determining the barring time period for a previous access attempt with the serving cell, wherein: the previous access attempt occurs earlier than an access attempt of the UE to initiate the UL data transmission procedure, and the previous access attempt and the access attempt of the UE to initiate the UL data transmission procedure belong to a same access category in the UAC mechanism.

Another implementation of the first aspect further includes not performing another UAC mechanism for the access attempt of the UL data transmission procedure until the barring time period elapses.

Another implementation of the first aspect further includes receiving the data volume threshold via UE-specific RRC signaling or via broadcasting system information.

Another implementation of the first aspect further includes determining the amount of pending UL data by considering pending data in all of a plurality of logical channels allowed by the serving cell for the UL data transmission during the RRC Inactive state.

According to a second aspect of the present disclosure, a UE for access control is provided. The UE includes a memory having computer-readable instructions embodied thereon and a processing circuitry coupled to the memory. The processing circuitry is configured to execute the computer-readable instructions to cause the UE to: while attempting to initiate an UL data transmission procedure with a serving cell during an RRC Inactive state of the UE, receive a radio resource configuration from the serving cell and transmit one or more UL packets to the serving cell based on the radio resource configuration when a plurality of conditions is fulfilled. The plurality of conditions includes an attempt to transmit UL data is not barred by the serving cell, and an amount of pending UL data to be transmitted is less than or equal to a data volume threshold.

In an implementation of the second aspect, the UL data transmission procedure is a random access (RA) procedure triggered by the UE based on the radio resource configuration.

In another implementation of the second aspect, the processing circuitry is further configured to execute the computer-readable instructions to cause the UE to: in the UL data transmission procedure, access at least one UL-configured grant (UL-CG) based on a UL-CG configuration pre-configured by the serving cell via UE-specific control signaling.

In another implementation of the second aspect, the processing circuitry is further configured to execute the computer-readable instructions to cause the UE to determine whether to access the at least one UL-CG for the UL data transmission procedure based on the data volume threshold; and determine whether to initiate an RA procedure for the UL data transmission procedure based on the data volume threshold.

In an implementation of the second aspect, the attempt of the UL data transmission is barred in a case that the UE receives, from the serving cell, system information comprising a cell-barred bit that indicates the serving cell is barred; or the serving cell is barred during a barring time period determined by the UE based on a result of a unified access control (UAC) mechanism.

In an implementation of the second aspect, the UAC mechanism is implemented by the UE for the UL data transmission procedure based on an access category (and/or a access identity) associated with the UL data transmission procedure.

In another implementation of the second aspect, the processing circuitry is further configured to execute the computer-readable instructions to cause the UE to determine the barring time period for a previous access attempt with the serving cell, wherein: the previous access attempt happens earlier than an access attempt of the UE to initiate the UL data transmission procedure, and the previous access attempt and the access attempt of the UE to initiate the UL data transmission procedure belong to a same access category in the UAC mechanism.

In another implementation of the second aspect, the processing circuitry is further configured to execute the computer-readable instructions to cause the UE to not perform another UAC mechanism for the access attempt of the UL data transmission procedure until the barring time period elapses.

In another implementation of the second aspect, the processing circuitry is further configured to execute the computer-readable instructions to cause the UE to receive the data volume threshold via UE-specific RRC signaling or via broadcasting system information.

In another implementation of the second aspect, the processing circuitry is further configured to execute the computer-readable instructions to cause the UE to determine the amount of pending UL data by only considering pending data in all of a plurality of logical channels allowed by the serving cell for the UL data transmission during the RRC Inactive state.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
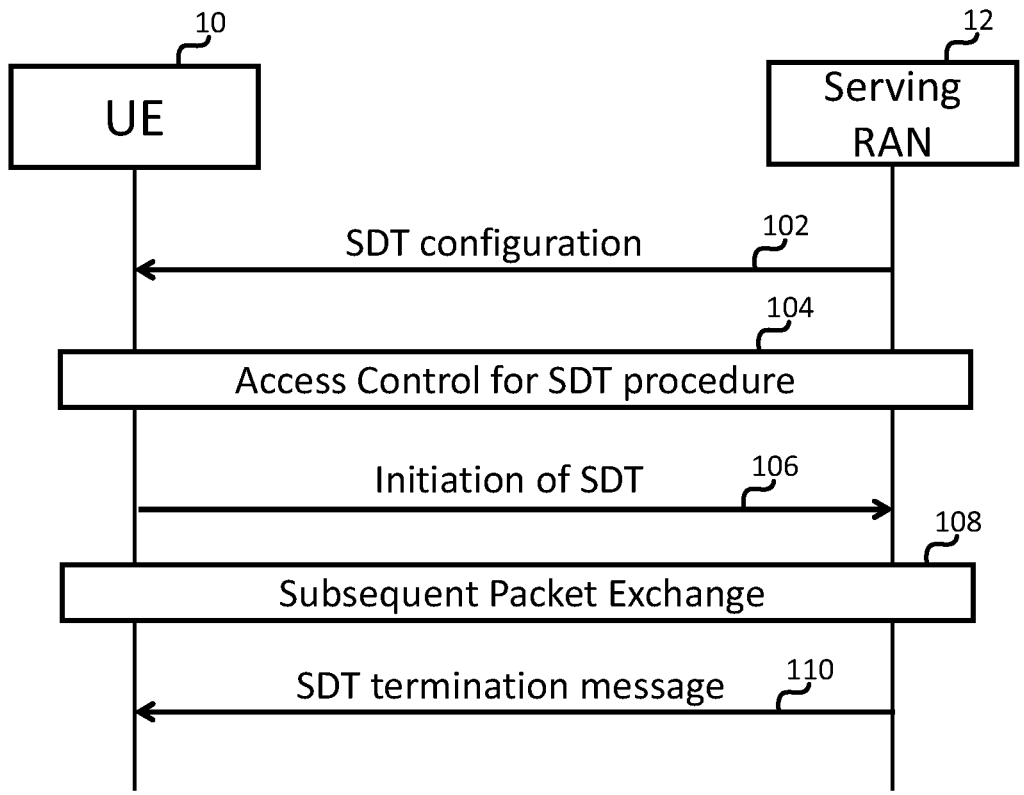
FIG. 1 is a schematic diagram illustrating a process for an access control mechanism while a UE attempts to initiate a Small Data Transmission (SDT) procedure with a serving Radio Access Network (RAN), in accordance with an implementation of the present disclosure.

The acronyms in the present application are defined as follows and unless otherwise specified, the acronyms have the following meanings:

Acronym Full Name

3GPP 3rd Generation Partnership Project
5GC 5G Core
ACK Acknowledgement
AMF Access and Mobility Management Function
ARQ Automatic Repeat Request
AS Access Stratum
BCCH Broadcast Control Channel
BCH Broadcast Channel
BFR Beam Failure Recovery
BS Base Station
BSR Buffer Status Report
BWP Bandwidth Part
CA Carrier Aggregation
CBRA Contention Based Random Access
CFRA Contention Free Random Access
CG Configured Grant
CM Connection Management
CN Core Network
CP Control Plane
C-RNTI Cell Radio Network Temporary Identifier
CG-SDT Configured Grant Small Data Transmission
CS-RNTI Configured Scheduling Radio Network Temporary Identifier
CSI-RS Channel State Information Reference Signal
DC Dual Connectivity
DCI Downlink Control Information
DL Downlink
DRB Data Radio Bearer
DRX Discontinuous Reception
HARQ Hybrid Automatic Repeat Request
ID Identifier
IE Information Element
I-RNTI Inactive Radio Network Temporary Identifier
LCH Logical Channel
LCG Logical Channel Group
LCP Logical Channel Prioritization
MAC Medium Access Control
MIB Master Information Block
MSG Message
NAS Non-Access Stratum NACK Negative Acknowledgement
NG-RAN Next-Generation Radio Access Network
NR New Radio
NW Network
PCell Primary Cell
PCCH Paging Control Channel
PDCCH Physical Downlink Control Channel
PDCP Packet Data Convergence Protocol
PDU Protocol Data Unit
PRACH Physical Random Access Channel
PUCCH Physical Uplink Control Channel
PUSCH Physical Uplink Shared Channel
PLMN Public Land Mobile Network
QOS Quality of Service
RA Random Access
RA-SDT Random Access Small Data Transmission
RACH Random Access Channel
RAN Radio Access Network
RB Radio Bearer
Rel Release
RLC Radio Link Control
RNA RAN-based Notification Area
RNTI Radio Network Temporary Identifier
RRC Radio Resource Control
RSRP Reference Signal Receiving Power
SCell Secondary Cell
SCG Secondary Cell Group
SCS Sub Carrier Spacing
SDT Small Data Transmission
SDU Service Data Unit
SFN System Frame Number
SI System Information
SIB System Information Block
SIB1 System Information Block Type 1
SINR Signal to Interference plus Noise Ratio
SLIV Start and Length Indicator
SNPN Stand-alone Non-Public Network
SR Scheduling Request
SRB Signaling Radio Bearer
SSB Synchronization Signal Block
S-TMSI SAE-Temporary Mobile Subscriber Identity
SUL Supplementary Uplink
TA Timing Advance or Time Alignment
TB Transport Block
TAG Timing Advance Group
TS Technical Specification
UAC Unified Access Control
UE User Equipment
UL Uplink
UL-CG Uplink Configured Grant
UP User Plane
UPF User Plane Function The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Application-Specific Integrated Circuitry (ASIC), programmable logic arrays, and/or using one or more Digital Signal Processors (DSPs). Although some of the disclosed implementations are oriented to software installed and executing on computer hardware, alternative implementations implemented as firmware or as hardware or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, LTE/NR sidelink communication services, LTE/NR sidelink discovery services, and/or LTE/NR Vehicle-to-Everything (V2X) services.

In NR, a packet transmission mechanism that allows a UE to perform data transmissions in an RRC Inactive state is introduced. The packet transmission is also referred to as "SDT (or small data transmission)" or "small packet transmission" in the present disclosure. As such, the terms, "packet transmission," "SDT" and "small packet transmission" are interchangeably in the present disclosure.

In some aspects of the present disclosure, (part of) the access control for small packet transmission may be implemented in the RRC layer (or RRC entity). The RRC layer may instruct the MAC layer whether the MAC entity is enabled (or disabled) to deliver packets by using the RA procedure (e.g., via a 2-step/4-step RA procedure) or by using one or more uplink configured grant configuration(s). The UE may observe the cell is 'barred' by detecting that the value of a 'CellBarred' bit changes from 'NotBarred' to 'Barred' (or vice versa). Some implementations of the disclosure provide UE/RAN mechanisms while the cell-barring mechanism is considered in the (small) packet transmission mechanisms. In some other aspects of the present disclosure, (part of) the access control for small packet transmission may be implemented in the MAC layer (or MAC entity). The MAC layer may inform the RRC layer whether the MAC entity is enabled (or disabled) to deliver packets by using the RA procedure (e.g., via a 2-step/4-step RA procedure) or by using one or more uplink configured grant configuration(s). The UE may observe the cell is 'barred' by detecting that the value of the CellBarred bit changes from 'NotBarred' to 'Barred' (or vice versa). Some implementations of the disclosure provide UE/RAN mechanisms while the cell-barring mechanism is considered in the (small) packet transmission mechanisms.

In some aspects of the present disclosure, during the packet transmission through a 2-step/4-step RA procedure, the UE may receive an RRC reject (RRCReject) message from the serving cell. Some implementations of the disclosure provide a packet transmission mechanism that considers the transmission or reception of the RRCReject message.

In some aspects of the present disclosure, the Unified Access Control (UAC) mechanism (e.g., the UAC mechanism in 3GPP TS 38.331 or TS 38.304) may be implemented in the MAC layer (e.g., in the MAC entity) or RRC layer (e.g., in the RRC entity). The MAC layer may determine whether an RA procedure and the associated pre-configured RA resources for UEs (e.g., UEs in an RRC Inactive state or an RRC Idle (i.e., RRC idle) state) is applicable to the UE for the small packet transmission and the associated access category while the RRC message (e.g., RRCResumeRequest message) is multiplexed with the pending UL packet. In some implementations, another access category for the SDT may be decided alternatively if the RRC message (e.g., RRCResumeRequest message) is not multiplexed with the UL packet during the SDT procedure (e.g., via an RRC-less small packet transmission procedure).

In some aspects of the present disclosure, some additional rules about RA prioritization for (small) packet transmissions are also provided.

In some aspects of the present disclosure, access control may be implemented based on a data volume.

In some implementations, the UE may determine whether to initiate small packet transmission (through the (2-step/4-step) RA procedure or UL-CG configuration) based on a (pre-) configured data volume threshold.

It should be noted that even though the mechanisms described in the present disclosure are mostly described with regard to the UEs in an RRC inactive state, the described mechanisms may also be applicable to the UEs in an RRC idle state.

In addition, a UE may be configured with resources (e.g., physical resource blocks, PRACH resources, PUSCH resources, preambles for (small) packet transmission through RA procedure, and/or Uplink-Configured Grant (UL-CG) configuration for (small) packet transmission) on a Supplementary Uplink (SUL) carrier and/or Normal Uplink carrier (NUL). Also, as discussed above, a (small) packet transmission may be implemented through a 2-step/

4-step RA procedure, and/or through a (pre-)configured resource transmission (e.g., through UL-CG).

In some aspects of the present disclosure, an indicator (e.g., a cell-barred ('CellBarred') bit) may influence a UE to determine whether the UE is allowed (or enabled) to initiate a (small) packet transmission procedure while the UE is in an RRC Inactive/Idle state.

In some implementations, the serving cell may transmit the CellBarred bit through broadcasting approach (e.g., the cell may broadcast the CellBarred bit in the Master Information Block (MIB), which may be broadcasted in the Physical Broadcasting Channel (PBCH)). The CellBarred bit may be set to a value of 'Barred' or 'NotBarred'. For example, the serving cell (or a neighbor cell in the serving RAN) may be considered as 'barred' if the UE receives a CellBarred bit set to 'Barred' during the system information reception. On the other hand, the serving cell may be considered as "not barred' if the UE receives a CellBarred bit set to 'NotBarred' during the system information reception. If the UE considers the serving cell to be 'barred', the UE may not be permitted to (re)select this cell (e.g., not even for an emergency call) at least during a time period (e.g., 300 seconds) and so the UE may start to camp on another neighbor cell. In some implementations, the UE may be configured with a small packet transmission configuration by the serving cell before the UE receives the CellBarred bit from the same serving cell. In some other implementations, the UE may be configured with a small packet transmission configuration by the serving cell before the UE receives the CellBarred bit from a different serving cell.

In some implementations, the UE may not be allowed (or may be disabled) to implement (small) packet transmission through an RA procedure with a first cell (or via one or more UL-CG configurations, which may be configured by the first cell) if the first cell is barred to the UE. The UE may consider the cell to be barred to itself if the CellBarred bit is set to 'Barred'. Cells in the serving RAN may broadcast the CellBarred bit through broadcasting information (e.g., in the MIB). Then, the UE may re-select to another second cell and then implement (small) packet transmission through an RA procedure with the second cell.

In some implementations, the MAC entity may release the stored resource (with/without the stored resource configuration) pre-configured for (small) packet transmission through an RA procedure (if there is any configuration stored in the MAC entity) after the UE receives the cell-Barred bit set to 'Barred' during MIB reception.

In some other implementations, the MAC entity may suspend the stored physical resources (and/or the stored resource configuration) pre-configured for (small) packet transmission through an RA procedure. The suspended physical resource (and/or the stored resource configuration) may be applicable again after the UE is enabled to transmit packets through an RA procedure (e.g., the cell may change the value of the CellBarred bit from 'Barred' to 'NotBarred' to enable the UE to re-activate those 'suspended' physical resources for small packet transmission).

In some other implementations, the MAC entity may suspend the stored physical resources (and/or the stored resource configuration) pre-configured (by a first serving cell) for (small) packet transmission through (at least) one UL-CG configuration. The suspended physical resource (and/or the stored UL-CG resource configuration) may be applicable again after the UE is enabled to transmit packets with the first serving cell (e.g., the cell may change the value of the CellBarred bit from 'Barred' to 'NotBarred' to enable the UE to re-activate those 'suspended' physical resources for small packet transmission) later.

In some implementations, a timer may be triggered (by the UE) to be counted to zero while the MAC entity of the UE suspends the stored physical resources (and/or the stored resource configuration) pre-configured for (small) packet transmission. The initial value of the timer may be pre-defined in the technical specification (e.g., 300 seconds) or be configured by the serving RAN through broadcasting system information or UE-specific RRC signaling. Before the running timer expires (or counts to zero), the UE may be able to resume the suspended resource configuration (e.g., an RA resource configuration and/or an UL-CG resource configuration) while the UE finds out the serving cell is not barred to the UE (e.g., the CellBarred bit is set to 'NotBarred'). However, in some additional implementations, after the running timer expires, the UE may release the suspended physical resource (and/or the stored CG-SDT/RA-SDT resource configuration).

In some implementations, the UE (or MAC entity) may consider that a time alignment timer (e.g., one Time Alignment Timer (TAT_inactive) to maintain the UL timing while the UE is staying in RRC inactive state) expires after the UE receives a CellBarred bit set to 'Barred' during MIB reception. In some implementations, the time alignment timer (TAT_inactive) may be used while a UE is in the RRC_INACTIVE state (i.e., RRC inactive state). In some implementations, the time alignment timer (TAT_inactive) may be configured in an RRC release (RRCRelease) message. For example, the time alignment timer may be configured in the suspend configuration of the RRCRelease message.

In some implementations, the TAT_inactive may not be active after the UE receives a timing advance command in the Random Access Response (RAR) message. The TAT_inactive may be released after the UE receives the timing advance command in the RAR message during RA procedure. Another timing advance timer may be triggered at the same time.

In some implementations, the UE may reset the MAC layer or the MAC entity(ies) after the UE receives a CellBarred bit set to 'Barred' during the MIB reception.

In some other implementations, the RRC entity may release the stored physical resources (and/or the stored resource configuration) pre-configured for (small) packet transmission through an RA procedure (e.g., if there is any configuration stored in the RRC entity) after the UE receives a CellBarred bit set to 'Barred' during the MIB reception. In some implementations, the RRC entity may be informed (or be requested) by the MAC entity to release the stored physical resources (and/or the stored resource configuration).

In some other implementations, the RRC entity may suspend the stored physical resources (and/or the stored resource configuration) pre-configured for (small) packet transmission through an RA procedure. In such a situation, the suspended physical resources may be applicable again after the UE is enabled to transmit packets through an RA procedure (e.g., the same cell may turn the CellBarred bit from 'Barred' to 'NotBarred' and so this enables the UE to re-activate those 'suspended' physical resources for small packet transmission). In some implementations, after receiving the CellBarred bit set to 'NotBarred' from the serving cell, the UE may still need to implement a UAC mechanism and the UE may be enabled to transmit packets through an RA procedure if the UE also passes the UAC mechanism.

In some implementations, at the UE side, the RRC entity may instruct the MAC entity to clear the stored physical resources pre-configured for (small) packet transmission through an RA procedure. In some other implementations, the RRC entity may release the stored physical resources pre-configured for (small) packet transmission through an RA procedure. In some other implementations, the RRC entity may instruct the MAC entity to suspend the stored physical resources (and/or the stored resource configuration) pre-configured for (small) packet transmission through an RA procedure. In such a situation, the suspended physical resources may be applicable again after the UE is enabled to transmit packets through an RA procedure (e.g., the cell may turn the CellBarred bit from 'Barred' to 'NotBarred' and thus the RRC entity may re-activate those 'suspended' physical resource for small packet transmission. Then, the RRC entity may re-instruct the MAC entity to apply these re-activated physical resources for packet transmission through an RA procedure).

In some implementations, the MAC entity may apply an RA procedure for (small) packet transmission without considering the CellBarred bit in the broadcasting MIB. In some other implementations, the MAC entity may apply an SDT procedure for (small) packet transmission via one or more UL-CG configurations without considering the CellBarred bit in the broadcasting MIB.

In some implementations, the UE may determine whether to initiate an RA-SDT procedure or a CG-SDT procedure, while an UL data arrives during the RRC inactive mode, based on an indication indicated by the network. More specifically, the indication may or may not be the CellBarred bit. More specifically, the indication may be indicated by RRC signaling, MAC Control Element (MAC CE), and/or Downlink Control Information (DCI).

However, in some implementations, the MAC entity may not be allowed to transmit RRC control signaling (e.g., RRC Resume Request message) jointly with the pending (User-plane) packet(s) in the triggered RA procedure if there is any pending RRC control signaling in the MAC entity. Moreover, the MAC entity of the UE may remove (or re-fresh) the pending RRC signaling if the UE considers the cell is barred (e.g., by receiving the CellBarred bit set to 'Barred' in the MIB). In such a situation, the C-Plane data transmission may be barred by the CellBarred bit and the U-Plane data transmission may not be barred by the CellBarred bit. In some other cases, neither the U-Plane data nor the C-Plane control signaling may be barred by the CellBarred bit.

In some aspect of the present disclosure, the mechanisms may also be applicable to a UE configured with a UL-CG configuration for (small) packet transmission.

In some implementations, the MAC entity may release the stored resource (e.g., with/without the stored resource configuration) pre-configured for (small) packet transmission through an UL-CG procedure (e.g., if there is any configuration stored in the MAC entity) after the UE receives a CellBarred bit set to 'Barred' during MIB reception.

In some other implementations, the MAC entity may suspend the stored UL-CG (and/or the stored UL-CG configuration) pre-configured for (small) packet transmission. In such a situation, the suspended UL-CG (and/or the stored UL-CG configuration) may be applicable again after the UE is enabled to transmit packets again (e.g., the cell may turn the CellBarred bit from 'Barred' to 'NotBarred' to enable the UE to re-activate those 'suspended' physical resource for small packet transmission).

In some implementations, a timer may be triggered to be counted to zero while the MAC entity suspends the stored UL-CG (and/or the stored UL-CG configuration) pre-configured for (small) packet transmission. The initial value of the timer may be pre-defined in the technical specification (e.g., 300 seconds) or be configured by the serving RAN through broadcasting system information or UE-specific RRC signaling. Before the running timer expires (or counts to zero), the UE may be able to resume the suspended resource configuration while the UE finds out the serving cell is not barred to the UE (e.g., the CellBarred bit is set to 'NotBarred'). After the running timer expires, the UE may release the suspended UL-CG (and/or the stored UL-CG configuration).

In some implementations, the UE (or MAC entity) may clear all configured UL grants or the pre-configured resources (e.g., for small packet transmission) after the UE receives the CellBarred bit set to 'Barred' during MIB reception. In the present disclosure, the words "clear" and "release" may be utilized interchangeably without different meaning. For example, "a UE clears a configured UL grant" may mean that the configured UL grant is released by the UE.

In some other implementations, the UE's RRC entity may release the stored UL-CG (and/or the stored UL-CG configuration) pre-configured for (small) packet transmission (if there is any configuration stored in the RRC entity) after the UE receives the CellBarred bit set to 'Barred' during MIB reception. In some implementations, the RRC entity may be informed (or be requested) by the MAC entity to release the stored UL-CG resources (and/or the stored UL-CG configuration).

In some other implementations, the UE's RRC entity may suspend the stored UL-CG (and/or the stored UL-CG configuration) pre-configured for (small) packet transmission. In such a situation, the suspended physical resources may be applicable again after the UE is enabled to transmit packets again (e.g., the cell may turn the CellBarred bit from 'Barred' to 'NotBarred' to enable the UE to re-activate those 'suspended' physical resources for small packet transmission).

In addition, a timer may be triggered to be counted to zero while the RRC entity suspends the stored UL-CG (and/or the stored UL-CG configuration) pre-configured for (small) packet transmission. The initial value of the timer may be pre-defined in the technical specification (e.g., 300 seconds) or be configured by the serving RAN through broadcasting system information or UE-specific RRC signaling. Before the running timer expires (or counts to zero), the UE may resume the suspended UL-CG (and/or the stored UL-CG configuration) while the UE finds that the serving cell is not barred to the UE (e.g., the CellBarred bit is set to 'NotBarred'). However, after the running timer expires, the UE may finally release the suspended physical resource (and/or the stored UL-CG configuration).

In some implementations, the RRC entity may instruct the MAC entity to clear the store UL-CG (and/or the stored UL-CG configuration) pre-configured for (small) packet transmission.

In some other implementations, the RRC entity of the UE may instruct the MAC entity of the UE to suspend the stored UL-CG (and/or the stored UL-CG configuration) pre-configured for (small) packet transmission. In such a situation, the suspended UL-CG (and/or the stored UL-CG configuration) may be applicable again after the UE is enabled to transmit packets (e.g., the cell may turn the CellBarred bit from 'Barred' to 'NotBarred' so the RRC entity may re-activate those 'suspended' physical resources for small packet transmission. Then, the RRC entity may re-instruct the MAC entity to apply these re-activated physical resources for (small) packet transmission through the configured UL-CG).

In addition, a timer may be triggered in the RRC entity to be counted to zero while the RRC entity suspends the stored UL-CG (and/or UL-CG configuration) pre-configured for (small) packet transmission. The initial value of the timer may be pre-defined in the technical specification (e.g., 300 seconds) or be configured by the serving RAN through broadcasting system information or UE-specific RRC signaling. Before the running timer expires (or counts to zero), the RRC entity may instruct the MAC entity to resume the suspended UL-CG (and/or the stored UL-CG configuration) while the UE finds out the serving cell is not barred to the UE (e.g., the CellBarred bit is set to 'NotBarred'). However, after the running timer expires, the RRC entity may instruct the MAC entity to release the suspended UL-CG (and/or the stored UL-CG configuration).

In some implementations, the UE may observe that the serving cell is barred while the UE is waiting for the HARQ response from the serving cell after transmitting one (or more) UL packet(s) through a (2-step/4-step) RA procedure or through a pre-configured UL-CG configuration. In other words, the cell may not be considered barred while the UE is transmitting the UL packet(s) if an SDT procedure is already initiated by the UE. In some implementations, the running SDT procedure may be extended by the serving cell if the serving cell transmits one or more dynamic DL assignments/UL grants, which is also called subsequent packet transmission, to the UE during the SDT procedure. In this condition, the subsequent packet transmission may also be considered as part of the SDT and so the UE may not detect the CellBarred bit of the serving cell (or the UE ignores the CellBarred bit of the serving cell) during the subsequent packet transmission. In some other implementations, the UE may not implement the UAC mechanism for the subsequent packet transmission after the SDT procedure already passes the UAC mechanism.

Thus, in some implementations, the CellBarred bit may not influence the feedback mechanism, which means that the UE may still be able to receive a Hybrid Automatic Repeat reQuest (HARQ) response (e.g., HARQ ACK/NACK messages or Discontinuous Transmission (DTX) condition, which means no response is received from the serving cell) even if the UE detects that the CellBarred bit is 'Barred' during the (small) packet transmission. The serving cell may still create and transmit a (HARQ) response message to the UE after the CellBarred bit is barred. Moreover, the ongoing (small) packet transmission may be continued until the UL packet transmission is terminated (e.g., upon the UE receiving a HARQ ACK message, upon the UE reaching the maximum number of re-transmissions for HARQ re-transmission, or upon the UE receiving an RRC message from its serving cell to terminate the running SDT procedure).

In some implementations, the UE may ignore the Cell-Barred bit broadcast by the serving cell when the UE is performing small packet transmission (e.g., when the UE is waiting for the HARQ response). It is possible that the UE may receive the CellBarred bit, but then ignore the Cell-Barred bit. For example, the UE may ignore the CellBarred bit until the ongoing UL packet transmission is terminated (e.g., upon the UE receiving one HARQ ACK message, upon the UE reaching the maximum number of retransmissions for HARQ re-transmission, or upon the UE receiving an RRC message from its serving cell to terminate the running SDT procedure).

In some other implementations, the UE may stop monitoring the (HARQ) response from the serving cell after the UE detects the CellBarred bit is 'Barred'. In addition, the UE may flush the soft buffer after the UE detects the CellBarred bit is 'Barred'. As for the RA procedure (e.g., initiated for small packet transmission), the on-going RA procedure may also be stopped. In such a situation, in some implementations, the UE may not count this event (e.g., the UL packer transmission is barred by the serving cell) as a failed HARQ re-transmission. In some other implementations, the UE may count this event (e.g., the UL packet transmission is barred by the serving cell) as a failed HARQ re-transmission.

In some implementations, the UE may stop the ongoing (2-step/4-step) RA procedure (e.g., triggered for small packet transmission) (e.g., a RA-SDT procedure) after detecting that the CellBarred bit indicates the UE is barred from the serving cell. In some implementations, the ongoing RA-SDT procedure may be stopped no matter whether the UE has transmitted any preamble/(small) packet successfully or whether the UE is waiting for the HARQ response message. In some other implementations, the UE may stop the ongoing small packet transmission implemented via one or more stored UL-CG configuration(s) (i.e., a CG-SDT procedure) after detecting that the CellBarred bit indicates the UE is barred from the serving cell. In some implementations, the ongoing CG-SDT procedure may be stopped no matter whether the UE has transmitted any preamble/(small) packet successfully or whether the UE is waiting for the HARQ response message.

In some implementations, the UE may maintain (e.g., not release) the physical resources (and/or the stored resource configuration) pre-configured for (small) packet transmission through an RA procedure from the source serving cell even if the UE disconnects from the source serving cell and connects to a target serving cell.

In some implementations, the UE may maintain (e.g., not clear) the stored UL-CG (and/or the stored UL-CG configuration) pre-configured for (small) packet transmission from the source serving cell even if the UE disconnects from the source serving cell and connects to a target serving cell.

In some implementations, the UE may maintain (e.g., not flush) the HARQ buffer associated with one SDT procedure even if the UE disconnects from the source serving cell and connects to a target serving cell and so the SDT procedure (associated with the source serving cell) may be interrupted.

In some implementations, a validity area may be configured along with the physical resource configuration or the UL-CG configuration. For example, the UE may maintain the stored physical resource configuration/UL-CG configuration (e.g., in some implementations, also including the pending TBs in the buffer) only while the target serving cell also belongs to the validity area of the stored physical resource configuration (e.g., random access resources)/UL-CG configuration. Otherwise (e.g., the selected target cell may not be part of the defined validity area), the UE may remove (or release) the stored physical resource configuration or UL-CG configuration after the UE re-selects to the target serving cell.

The validity area information may be composed by at least one cell identity (e.g., the cell identity or the physical cell identity (PCI), which may be broadcasted by each cell in the broadcasting system information), systeminformationareacode/systeminformationareaID, Tracking Area Code (TAC) or RAN Notification Area Code (RNAC). In some implementations (e.g., in the RAN sharing scenario), the validity area may be further associated with one Network Identity (e.g., the first PLMN identity configured in a Network Identity list broadcasted by the serving cell via the broadcasting system information).

In some implementations, the source serving cell and the target serving cell may operate on the same frequency carrier (e.g., in DL/UL directions). In some other implementations, the source serving cell and the target serving cell may operate on different frequency carriers (e.g., in DL/UL directions).

During the cell (re)selection procedure, the UE may give the cells in the given validity area a higher priority (e.g., in comparison with the cells not in the given validity area). The validity area configuration may be removed/released after the UE moves to an RRC idle state or moves to another RAT (e.g., E-UTRA).

In addition, the pending (multiplexed) TBs in the Layer 1 (e.g., Physical Layer)/Layer 2 (e.g., the MAC Layer) may be removed while the UE detects that the CellBarred bit is 'Barred' during the (small) packet transmission. In some other implementations, the pending TBs in the Layer 2 (e.g., the RLC layer, PDCP layer, SDAP layer) may be suspended or released while the UE detects that the CellBarred bit is 'Barred' before the UE is allowed/enabled to initiate one SDT procedure (e.g., an RA-SDT procedure or a CG-SDT procedure). An RA-SDT procedure may refer to an SDT procedure in which a UE performs SDT via an RA procedure/resource. An CG-SDT procedure may refer to an SDT procedure in which a UE performs SDT via a UL-CG resource.

It should be noted that even though some of the mechanisms described above or below are described for the CellBarred bit in the MIB, in some implementations, the described mechanisms are applicable to other cell barring configurations delivered by the serving cell through broadcasting system information. In some other implementations, the described mechanisms are applicable to the condition that the serving cell does not broadcast any Tracking Area Code (TAC). In such a situation, the UE may also consider such cell is barred. In some other implementations, the described mechanisms may be applied when the condition(s) of performing a cell re-selection procedure to other cells is satisfied and/or upon a UE initiating a cell re-selection procedure. In an implementation, a UE may release or clear the stored resource (e.g., with/without the stored resource configuration) pre-configured for (small) packet transmission (e.g., if there is any configuration stored in the MAC entity) when the condition(s) to perform cell re-selection procedure to other cells has been satisfied and/or upon a UE initiating a cell-reselection procedure. In another example, the MAC entity may suspend the stored physical resources (and/or the stored resource configuration) pre-configured for (small) packet transmission through an RA procedure (or via configured UL-CG configurations) when the condition(s) to perform cell-reselection procedure to other cells has been satisfied and/or upon a UE initiating a cell-reselection procedure.

In some implementations, the timers described in the present disclosure may be reset (or recounted) if the UE receives a new SDT configuration from the serving cell (e.g., through broadcasting system information or through UE-specific control signaling, such as an RRCRelease message).

In some aspects of the present disclosure, a UE may receive an RRCReject message while the UE multiplexes an RRC resume request (RRCResumeRequest) (or RRCResumeRequest1) message with U-Plane data.

For example, the RRCResumeRequest (e.g., RRCResumeRequest for a RAN Notification Area Update procedure) with/without multiplexed data may be delivered through an RA procedure. Then, after receiving RRCReject message during the RA procedure, the UE may release the active Data Radio Bearer(s) (DRB(s), e.g., the active DRBs for packet transmission while the UE is staying in RRC inactive state) or active Signaling Radio Bearer(s) (SRB(s), e.g., the active SRBs, such as SRB0/SRB1/SRB2, for packet transmission while the UE is staying in RRC inactive state). In some implementations, the active DRBs/SRB(s) may be suspended after the UE receives the RRCReject message. The pending packets (e.g., the pending TBs in the buffer) may be removed/released after the UE receives the RRCReject message.

In some implementations, the pre-configured UL-CG configuration may also be released if the UE receives the RRCReject message from the (same) serving cell. In some implementations, the pre-configured UL-CG configuration may be suspended if the UE receives an RRCReject message from the (same) serving cell. In some other implementations, the pre-configured UL-CG configuration may be still active while the UE receives the RRCReject message from the (same) serving cell. In some implementations, the higher layer of the UE (e.g., RRC entity) may instruct the lower layer of the UE (e.g., MAC entity) to clear the configured grant and/or release the UL-CG configuration if the UE receives the RRCReject message.

In some implementations, the UE (e.g., the MAC entity of the UE) may consider that a time alignment timer expires if the UE receives RRCReject message. In some implementations, the UE (or the MAC entity of the UE) may consider a time alignment timer (e.g., one Time Alignment Timer (TAT_inactive) to maintain the UL timing while the UE is staying in the RRC inactive state) expires after the UE receives the CellBarred bit that is set to 'Barred' during the MIB reception. In some implementations, the time alignment timer (TAT_inactive) may be used while a UE is in the RRC inactive state. In some implementations, the time alignment timer (TAT_inactive) may be configured in (the suspend configuration of) the RRCRelease message. In some implementations, the UE may reset the TAT_inactive to its initial value and then count the TAT_inactive to zero every time when the UE receives one timing advance command (e.g., a timing advance command MAC CE or a timing advance command in RAR message during an RA procedure) from its serving cell. Then, a UE may consider a CG-SDT procedure as failed or the CG-SDT configuration as invalid if the TAT_inactive expires. In some other implementations, the TAT_inactive may not be active after the UE receives a timing advance command in the RAR message. Therefore, the TAT_inactive may be released after the UE receives the timing advance command in the RAR message during an RA procedure. Then, another timing advance timer may be triggered at the same time.

In some implementations, the UE may reset the MAC entity/layer if the UE receives the RRCReject message. The serving cell may consider the UL-CG configuration as released (and so the UE is disabled from (small) packet transmission through an RA procedure) or suspended by sending the RRCReject message to the UE. In addition, the pending packets (e.g., the packets pending in the MAC buffer) may also be released (or removed) from the (HARQ/MAC) buffer. The MAC buffer (or soft buffer pending for HARQ processes) may be flushed after receiving the RRCReject message from the serving cell (e.g., the serving cell which enables the UE to implement (small) packets transmission while the UE is staying in the RRC inactive state).

In some other implementations, the RRCResumeRequest (e.g., an RRCResumeRequest for an RNA Update (RNAU) procedure) with/without multiplexed data may be first delivered through pre-configured UL-CG resources. Then, after receiving the RRCReject message (e.g., by receiving the response message from the serving cell after uplink packet transmission through the pre-configured UL-CG), the UE may release the active Data Radio Bearer(s) (DRB(s), e.g., the active DRBs (if there are any) for packet transmission while the UE is staying in RRC inactive state) and/or active SRBs.

In some implementations, the UE may apply a Signaling Radio Bearer (e.g., SRB1) for the UL (small) packet transmission if the DRBs are released after receiving the RRCReject message from the serving cell.

In some implementations, the SRB1 may be retained (and suspended) after the UE receives the RRCReject message. In contrast, the active/resume DRBs may be released. In such a situation, the UE may re-create the TBs to be transmitted and then the UE may try to send the pending TBs through the SRB1 instead. In some implementations, this mechanism may be considered as a switch mechanism for the serving cell to instruct the UE to switch from a UP-solution to a CP-solution. Please also note, in some implementations, one explicit indicator may be provided in the RRCReject message to instruct the UE to switch the (small) packet transmission approach. In some other implementations, it is an implicit switch approach and so the UE may switch the (small) packet transmission approach from a UP-solution to a CP-solution implicitly after receiving the RRCReject message.

In some implementations, the pre-configured UL-CG configuration may also be released if the UE receives RRCReject message from the (same) serving cell. In some implementations, the pre-configured UL-CG configuration may be suspended if the UE receives the RRCReject message from the (same) serving cell. In some other implementations, the pre-configured UL-CG configuration may be active while the UE receives the RRCReject message from the (same) serving cell.

In some implementations, an explicit indicator may be provided in the RRCReject message to instruct the UE to release the stored UL-CG configuration (and/or the stored physical resource configuration for packet transmission through a (2-step/4-step) RA procedure). In some implementations, the UE may release the stored UL-CG configuration in an implicit way that no indicator is provided in the RRCReject message.

In some implementations, after receiving the RRCReject message, the UE may only remove the stored (physical resource for RA procedure/UL-CG) configuration which the UE obtains through UE-specific control signaling (e.g., RRCRelease message or RRCReconfiguration message). In other words, the (RRC_Inactive) UE may still be able to perform the packet transmission through a normal RA procedure or a UL-CG configuration after receiving the RRCReject message if the corresponding configurations are provided by the serving cell through cell-specific control signaling (e.g., broadcasting system information or through an SI-on demand procedure).

The serving cell may also consider that the UL-CG configuration is released (and so the UE is disabled from (small) packet transmission through an RA procedure and/or through configured grant) by sending an RRCReject message to the UE.

In addition, the pending packets (e.g., the packets pending in the MAC buffer) may also be released (or removed) from the buffer. The MAC buffer (or soft buffer pending for HARQ processes) may be flushed after receiving the RRCReject message from the serving cell (e.g., the serving cell which enables the UE to implement (small) packets transmission while the UE is staying in RRC inactive state).

In some implementations, the mechanisms described above and below may only be applicable to the UEs which are enabled to implement an (2-step/4-step) RA procedure or a (pre-configured) UL-CG configuration (e.g., when the UE is in the RRC inactive state).

In some implementations, the mechanisms described above and below may only be applicable to the serving cell that enables the UE to transmit the packets through an RA procedure or the serving cell that configures an UL-CG configuration for the UE to transmit packets (e.g., when the UE is in the RRC inactive state). In addition, the UE may skip performing the described mechanism and fallback to an RRC inactive UE which is disabled from packet transmissions in the RRC inactive state after the UE reselects (or is re-directed) to another serving cell. In some other implementations, the UE may skip performing the described mechanism and fallback to an RRC idle UE after the UE reselects (or is re-directed) to another serving cell.

In some implementations, the mechanisms described above and below may cover an RRC resume procedure in which the UE transmits an RRC resume request (e.g., RRCResumeRequest) message or an RRC resume request 1 (e.g., RRCResumeRequest1) message.

In some implementations, for a transmitted UL packet (e.g., being multiplexed with RRCReject message), the UE may not count this event as a UL packet transmission fail event. In some other implementations, the UE may count this event as a UL packet transmission fail event.

In some implementations, for a transmitted UL packet (e.g., in which the UE receives an RRCReject message as the response of the transmitted UL packet), the UE may not count this event as a UL HARQ packet (re)transmission fail event. In some other implementations, the UE may count this event as a UL HARQ (re)transmission fail event.

As discussed above, a UE may transmit the RRCResumeRequest (or RRCResumeRequest1) message by applying the resources reserved for (small) packet transmission. However, in a conventional TS, the UE may still need to implement UAC while an RA procedure is initiated for an RRC resume procedure. In view of this, some implementations provide mechanisms for a UE to determine whether to implement a UAC procedure for small packet transmission while the small packet is transmitted through an RA procedure. Some implementations provide mechanisms for a UE to determine whether to implement the UAC procedure for small packet transmission while RRC signaling (e.g., a RRCResumeRequest message) is transmitted jointly. Some implementations provide mechanisms for a UE to determine which access category may be applied while the UE transmits the RNA Update Request message while the RNA Update Request message is multiplexed with a (small) packet. Some implementations provide mechanisms for determining whether a UE is still allowed to implement small packet transmission by initiating another RA procedure if the UE is barred (e.g., due to a UAC decision while the UE is triggered to start an RNA Update (RNAU) procedure) from the RNAU procedure.

During an RRC Resume procedure, the UAC mechanism may be implemented on the RRC layer and the MAC entity may initiate an RA procedure based on the instruction of the RRC layer (e.g., while the UAC is passed). Moreover, it is possible that the MAC entity may initiate an RA procedure by itself (e.g., for small packet transmission) and the RRC entity may or may not be involved (and so the UAC may not be implemented). A UE may be configured to implement a UAC mechanism while the UE is triggered to transmit UL packets through an RA procedure. In some implementations, the UE may be configured with one specific access category (and/or one specific Access Identity) for small packet transmission. Please note, in some implementations, both the RA-SDT procedure and CG-SDT procedure may share the same access category. However, in some implementations, the RA-SDT procedure and the CG-SDT procedure may be configured with different access categories. In some implementations, the access categories of RA-SDT procedure/CG-SDT procedure may be pre-defined in the technical specifications, pre-installed in the memory module of the UE side, or configured by the serving RAN via broadcasting system information or through one or more UE-specific DL-RRC signaling.

In some implementations, the UE may automatically use one default Access Identity (e.g., Access Identity Number set to '0') and/or default access category (e.g., access category set to '0') automatically (e.g., while the access attempt is initiated for small packet transmission) if the UE is not configured with any specific Access Identity/access category from the serving cell or from the pre-configuration. It is possible that for small packet transmission, the UE may use at least one of the operator-defined access categories.

FIG. 1 is a schematic diagram illustrating a process for an access control mechanism while a UE 10 attempts to initiate an SDT procedure with a serving RAN 12, in accordance with an implementation of the present disclosure.

In action 102, the UE 10 may receive an SDT configuration from the serving cell, which is part of the serving RAN 12 of the UE 10, when the UE is staying in the RRC Connected state. The SDT configuration may be included in UE-specific RRC signaling, such as an RRC reconfiguration (e.g., RRCReconfiguration) message or an RRCRelease message (e.g., RRCRelease message with an IE suspend configuration used to instruct the UE to move to the RRC Inactive state). After receiving the SDT configuration, the UE 10 may transition to the RRC Inactive state according to the received SDT configuration. In some implementations, the SDT configuration may include at least one of an RA resource configuration(s) and a (Type 1) UL-CG configuration(s). In some implementations, the SDT configuration may further indicate the radio bearers (or RLC bearers/logical channels) which are enabled/configured for small data transmission (e.g., while the UE is staying in the RRC Inactive state) and/or the logical channels associated with these radio bearers/RLC bearers/logical channels. In some additional implementations, the SDT configuration may further include the Layer-2 (e.g., PDCP/RLC/MAC layer)/Layer-1 (e.g., PHY layer) configurations/parameters of these (radio/RLC) bearers/logical channels for small data transmission.

The RA resource configuration(s) (e.g., the locations of Physical Resource Blocks (PRBs) for the UE to transmit preamble and/or multiplexed data and preamble sets which the UE can select to transmit to the serving cell during an RA procedure). In some other implementations, the RA resource configuration(s) may include the radio resource configuration for the UE 10 to initiate a 2-step RA procedure and/or the radio resource configuration for the UE 10 to initiate a 4-step RA procedure. In some implementations, the RA resource configuration for SDT procedures is an RA-SDT configuration and the SDT procedure implemented via the 2-step/4-step RA procedure is an RA-SDT procedure. In some implementations, the UE 10 may receive the RA-SDT configuration of its serving cell via broadcasting system information (e.g., via SIB1 or an SIB specific for SDT configuration). In addition, to an SDT-specific SIB which includes SDT configuration for one cell, the UE 10 may receive the SDT-specific SIB via a dedicated SIB Request procedure or via an SI (System Information) on-demand procedure. In some additional implementations, the RA resource configuration may include the radio resource configuration designated for (2-step/4-step) Contention-Based RA (CBRA) procedure and/or Contention-Free RA (CFRA) procedure.

On the other hand, the UE may receive the (Type 1) UL-CG configuration (e.g., the locations of PRBs for the UE to transmit one UL control signaling with multiplexed data via the configured Type 1 UL-CG configuration). In some implementations, the PRBs for an UL-CG configuration may appear periodically in the time domain, and so the UE could take advantage of the UL-CG configuration for SDT once there are any available pending packets. In some implementations, the Type 1 UL-CG configuration for SDT procedures is a CG-SDT configuration and the SDT procedure implemented via the Type 1 UL-CG configuration is a CG-SDT procedure.

In some implementations, the SDT configuration may further indicate one or more logical channels which are available/allowed/enabled for SDT. So, when one or more packets arrive to the Layer 2 (e.g., the MAC entity), the MAC entity may identify which logical channels that the arrived packets are associated with. The UE 10 may decide to initiate an SDT procedure if there is any packet pending in one or more logical channels which are enabled/configured for SDT (during the UE's RRC Inactive state). In contrast, the UE 10 may initiate one RRC resume procedure with its serving cell of the serving RAN 12 if there is any packet pending in one or more logical channels which are not enabled for SDT during the RRC Inactive state of the UE 10. So, in action 104, the UE 10 may implement the access control (mechanism) for the SDT procedure after the UE 10 observes one or more pending packets in at least one logical channel enabled for the SDT procedure. Please also note, in some implementations, (part of) the proposed access control mechanisms for SDT procedure may be implemented before there is any pending packet associated with the logical channel configured/enabled for the SDT procedure. For example, the UE may be forced to (re)select to another serving cell (e.g., cell #2) due to the original serving cell (e.g., cell #1, which configures SDT configuration to the UE) being considered barred, and then (part of) the stored SDT configuration may become invalid after the cell re-selection procedure, and the UE should not implement SDT procedure with the cell #2 with the invalid (part of the) SDT configuration.

In action 106, the UE 10 may perform initiation of the SDT by initiating an SDT procedure with the serving cell of the serving RAN 12 if the UE 10 passes the access control for the SDT procedure in action 104. The UE 10 may (temporally) not be able to initiate any SDT procedure (with its serving cell) if the UE 10 does not pass the access control.

The UE 10 may implement action 106 by various approaches. For example, the UE 10 may initiate a CG-SDT procedure by accessing (at least) one UL-CG physical resource to transmit (at least) a UL packet e.g., with/without (w/wo) multiplexing with an RRC resume request (RRCResumeRequest) message, which includes a UE-ID (e.g., I-RNTI) for the serving cell of the serving RAN 12 to identify the transmitter of the UL packet). In another example, the UE 10 may initiate an RA-SDT procedure by accessing (at least) one RA physical resource to transmit a UL packet (e.g., w/wo multiplexing with an RRCResumeRequest message, which includes a UE-ID (e.g., I-RNTI) for the serving cell of the serving RAN 12 to identify the transmitter of the UL packet). In some implementations, the RA-SDT procedure may be implemented via a 4-step RA procedure (e.g., the UE may transmit the UL packet w/wo a multiplexed RRCResumeRequest message in the MSG3 during a 4-step RA procedure) and so action 106 may be implemented via the MSG3 transmission from the UE 10 to the serving cell of the serving RAN 12. In some other implementations, the RA-SDT procedure may be implemented via a 2-step RA procedure (e.g., the UE may transmit the UL packet w/wo a multiplexed RRCResumeRequest message in the MSGA during a 2-step RA procedure) and so the action 106 may be implemented via the MSGA transmission from the UE to the serving cell of the serving RAN 12.

After receiving the UL packet from the UE 10 (e.g., transmitted by the UE 10 in action 106), the serving cell of the serving RAN 12 may reply to the UE 10 a Layer 1 ACK/NACK message (e.g., HARQ ACK/NACK message) to inform the UE 10 whether the UL packet has been received by the serving cell of the serving RAN 12 successfully. Then, in some implementations, the serving cell of the serving RAN 12 may further configure dynamic DL assignment(s)/UL grant(s), which may be transmitted via Downlink Control Information (DCI) in Physical Downlink Control Channels (PDCCHs), to the UE 10 to extend the running SDT procedure. Therefore, during the subsequent packet exchange in action 108, the UE 10 may receive a DL packet based on the received dynamic downlink assignment (via (at least) one DCI) and then the UE 10 may reply with a HARQ ACK/NACK message to the serving cell of the serving RAN 12 (e.g., also based on the received DCI associated with the DL packet). In addition, also during the subsequent packet exchange in action 108, the UE 10 may transmit an UL packet based on the received dynamic UL grant (e.g., via (at least) one DCI) and then the UE 10 may wait for the serving cell of the serving RAN 12 to reply a HARQ ACK/NACK message for the UL packet (e.g., also based on the received DCI associated with the UL packet). During the SDT procedure (and the subsequent packet exchange), the UE 10 and serving cell of the serving RAN 12 may further exchange a Layer 2 ACK/NACK message (e.g., ARQ ACK/NACK message) for DL/UL packet exchange.

In action 110, the serving cell of the serving RAN 12 may transmit (at least) one SDT termination message to the UE 10 to terminate the running SDT procedure (which may or may not include the subsequent packet exchange in action 108). In some implementations, the serving cell of the serving RAN 12 may transmit an RRC Release message (e.g., RRCRelease message with suspend configuration) to instruct the UE 10 to finish the running SDT procedure and stay in the RRC Inactive state. In some implementations, the serving cell of the serving RAN 12 may transmit an RRC Release message (e.g., RRCRelease message without suspend configuration) to instruct the UE 10 to finish the running SDT procedure and move to the RRC Idle state. In some other implementations, the serving cell of the serving RAN 12 may transmit an RRCResume message (or an RRC re-establishment message) to instruct the UE 10 to finish the running SDT procedure and move to the RRC Connected state. In some other implementations, the serving cell of the serving RAN 12 may transmit an RRC Setup message to instruct the UE 10 to finish the running SDT procedure and move to the RRC idle state to re-connect with the serving cell of the serving RAN 12.

The UE 10 may re-select its serving cell (e.g., the serving cell of the serving RAN 12) in one or actions illustrated in FIG. 1. In some implementations, the UE may receive the SDT configuration with a serving cell #1 and then the UE may move and re-select to another cell #2 as the UE's serving cell. In this condition, the UE 10 may implement the access control mechanism with the (serving) cell #2 in action 104. In some implementations, the UE 10 may re-select to another cell (e.g., cell #3) during the SDT procedure (or during the subsequent packet exchange). In some implementations, the UE may interrupt the running SDT procedure (and the subsequent packet exchange) and stay in the RRC inactive state (and the stored SDT configuration may or may not be kept by the UE 10 after the UE 10 re-selects to the cell #3) if cell re-selection is implemented during the SDT procedure. In some other implementations, the UE 10 may interrupt the running SDT procedure (and the subsequent packet exchange) and move to an RRC idle state. The stored SDT configuration may not be kept by the UE after the UE 10 moves to the RRC Idle state.

Figure 2:
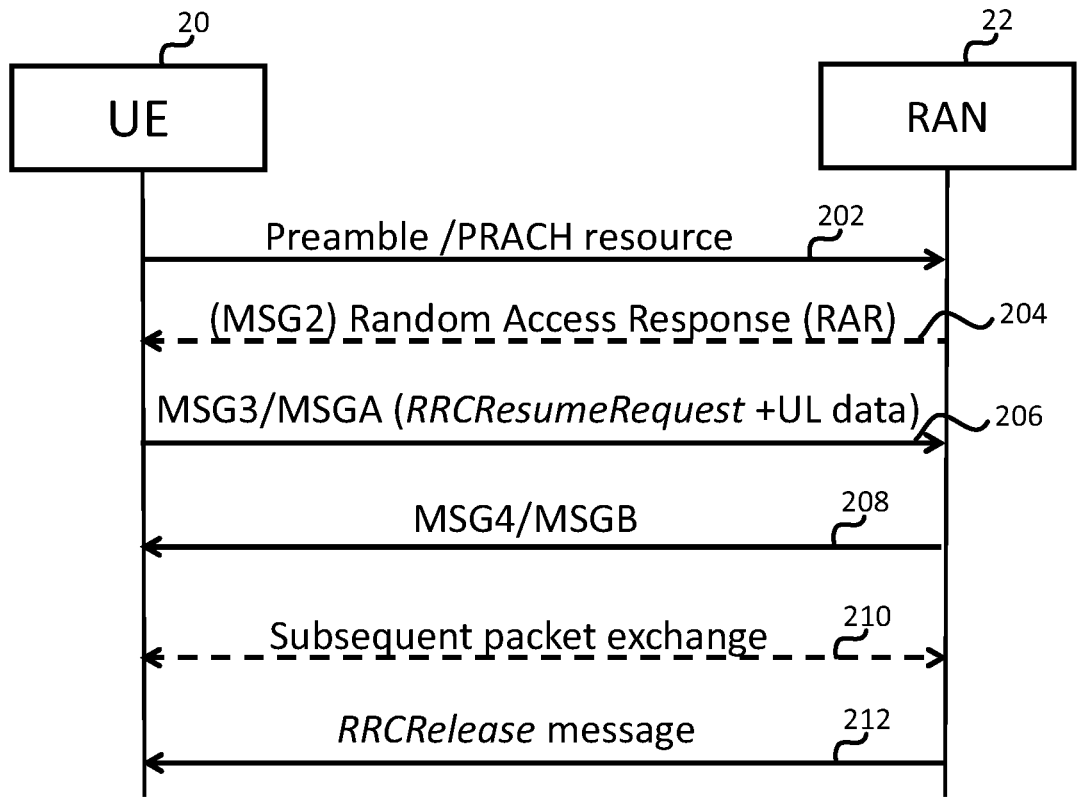
FIG. 2 illustrates an example of a Random Access SDT (RA-SDT) procedure, according to an implementation of the present disclosure.

FIG. 2 illustrates an example of an RA-SDT procedure according to an implementation of the present disclosure.

A UE may stay in an RRC Inactive state with the stored SDT configuration after receiving an RRCRelease message from its serving cell. When the UE in the RRC Inactive state has UL data available for transmission and the UE passes the access control for the SDT procedure, the UE may initiate an RA-SDT procedure for the transmission of the UL data (e.g., in a case that the CG-SDT configuration is considered as not valid). The UE may select a 4-step RA type or a 2-step RA type for the RA-SDT procedure. Moreover, the preamble/PRACH resource for an RA-based SDT procedure (e.g., RA preamble/PRACH resource configured for SDT) and a normal RA procedure (e.g., an RA preamble that is not configured for SDT) may be different. As illustrated in action 202 of FIG. 2, the UE 20 may (select and) transmit a preamble/PRACH resource configured for RA-SDT procedures.

In action 204, after transmitting a (RA) preamble/PRACH resource to the RAN 22 in action 202, the UE 20 may wait for the response (e.g., an RAR message) from its serving cell of the RAN 22 while the RA-SDT procedure is implemented via a (contention-based) 4-step RA procedure. The (MSG2) RAR message received in action 204 may further include a UL dynamic grant for the UE 20 to transmit the following MSG3.

In action 206, the UE 20 may transmit an RRC message (e.g., a Common Control CHannel (CCCH) message), MAC CE(s), and/or UL data through MSG3 (e.g., when the 4-step RA type is selected for the RA-SDT procedure) or MSGA (e.g., when the 2-step RA type is selected for the RA-SDT procedure). The RRC message may be an RRCResumeRequest message. In addition to the RRC message, the MAC CE (e.g., Buffer Status Report) and the UL data (e.g., data associated with DRB(s)/SRB(s) for SDT) may also be included in the MSG3/MSGA as well. In some implementations, a 2-step RA procedure (for SDT) may be implemented by merging action 202 and action 206 in a PRACH resource pre-configured for the 2-step RA procedure (and in such cases action 204 may be omitted during the 2-step RA procedure).

Once the MSG3/MSGA is transmitted, in action 208, the UE 20 may monitor Temporary C-RNTI/C-RNTI/RA-RNTI/MSGB-RNTI for MSG4/MSGB, in which the contention resolution ID will be carried. In addition, the RAN 22 may transmit an RRC message in the MSG4 (e.g., when the 4-step RA type is selected for the RA-SDT procedure)/ MSGB (e.g., when the 2-step RA type is selected for the RA-SDT procedure). The RRC message may be an RRCRelease message (e.g., with suspendConfig IE) or a RRCResume message. The UE 20 may stay in an RRC Inactive state if the UE 20 receives an RRCRelease message (e.g., with suspendConfig IE) and so the running SDT procedure may be terminated. In some implementations, the RA-SDT procedure may be considered successfully completed after the UE 20 receives the MG4/MSB successfully (e.g., as an ACK message from the serving cell of the RAN 22 that indicates that the UL data in MSG3/MSGA has been received by the (serving) RAN 22 successfully).

In some implementations, the RA-SDT procedure may be further extended (or a new subsequent packet exchange procedure is started after the RA-SDT procedure is terminated, as illustrated in action 210). For example, the UE 20 may monitor a specific RNTI (e.g., C-RNTI) on a specific search space for subsequent packet exchange in action 210. In some implementations, the serving cell of the RAN 22 may transmit one or more UL dynamic grants at action 208/action 210 for the subsequent packet exchange. The subsequent packet exchange may be the transmission of multiple UL and/or DL data packets as part of the SDT procedure and without transitioning to the RRC Connected state (e.g., the UE 20 is still in the RRC Inactive state). The UE 20 may monitor PDCCH via a specific RNTI (e.g., C-RNTI) to receive the dynamic scheduling for UL and/or DL new transmission and/or the corresponding packet retransmission (e.g., HARQ re-transmissions and/or ARQ re-transmissions).

In action 212, the (serving) RAN 22 may send an RRC release (with suspendconfig) message to the UE 20 to keep the UE 20 in the RRC Inactive state. Once the RRCRelease message (with suspendConfig IE) is received, the UE 20 may terminate the RA-SDT procedure based on the RRCRelease message, and/or stop monitoring the C-RNTI, and stay in the RRC Inactive state.

Figure 3:
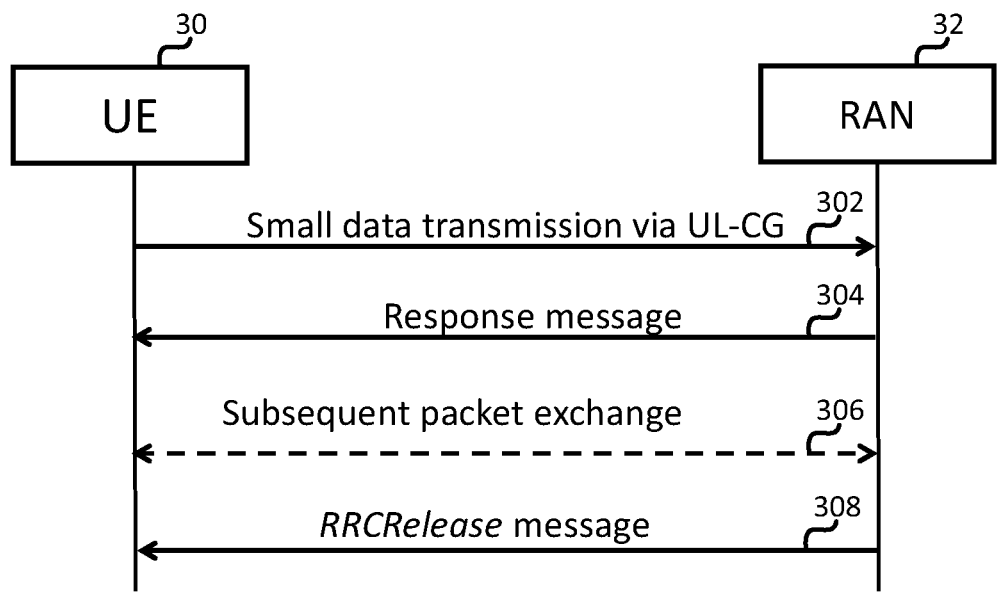
FIG. 3 illustrates an example of a Configured Grant SDT (CG-SDT) procedure, according to an implementation of the present disclosure.

FIG. 3 illustrates an example of a CG-SDT procedure according to an implementation of the present disclosure.

A serving RAN (e.g., RAN 32) may decide to move the UE 30 to an RRC Inactive state by sending an RRCRelease message (e.g., including suspendconfig IE) to the UE 30. The RRCRelease message may include an UL-CG configuration to configure the UL-CG resources to the UE 30. The (UL-)CG configuration may include at least one of CG periodicity, a TB size, a number for an implicit release of the CG resources, a CG timer, a retransmission timer, one or more HARQ processes (and the HARQ process ID(s)) reserved/configured for CG in SDT, a downlink RSRP threshold for an SSB selection and association between SSB and CG resources, TA related parameters (e.g., cg-SDT-TimeAlignmentTimer), and so on.

In action 302, the UE 30 may perform a small data transmission via a CG-SDT procedure based on the configured CG resources. Then in action 304, the UE 30 may monitor a response message from the serving RAN 32 (e.g., a HARQ ACK/NACK message for the UL packet transmitted in action 302). In some implementations, the serving cell of the RAN 32 may also transmit an RRCRelease message (with a suspend configuration (or a suspendconfig IE)) to the UE 30 in action 308. After receiving the RRCRelease message, the UE 30 may terminate the CG-SDT procedure.

In some implementations, a subsequent packet exchange may be implemented (in action 306) as part of the CG-SDT procedure (e.g., the UE is still in the RRC Inactive state).

The UE 30 may monitor (at least) a PDCCH via a specific RNTI (e.g., C-RNTI, CS-RNTI, and/or a new RNTI for SDT) on a search space (e.g., configured as part of the SDT configuration) to receive the dynamic scheduling for UL grant(s) and/or DL assignments and/or the corresponding retransmission (e.g., HARQ re-transmissions and/or ARQ re-transmissions). The UE 30 may monitor (at least) a PDCCH via the specific RNTI to receive the dynamic scheduling for the retransmission of packet which is transmitted via the stored UL-CG configuration. The UE 30 may also perform subsequent data transmission(s) via a CG resource according to the CG configuration (e.g., the SDT configured in action 102 of FIG. 1). In action 308, the serving RAN 32 may send an RRCRelease message (with the suspendconfig IE) message to keep the UE 30 in the RRC Inactive state. Once the RRCRelease message (with the suspendConfig IE) is received at action 308, the UE 30 may terminate the CG-SDT procedure in response to receiving the RRCRelease message.

Figure 4:
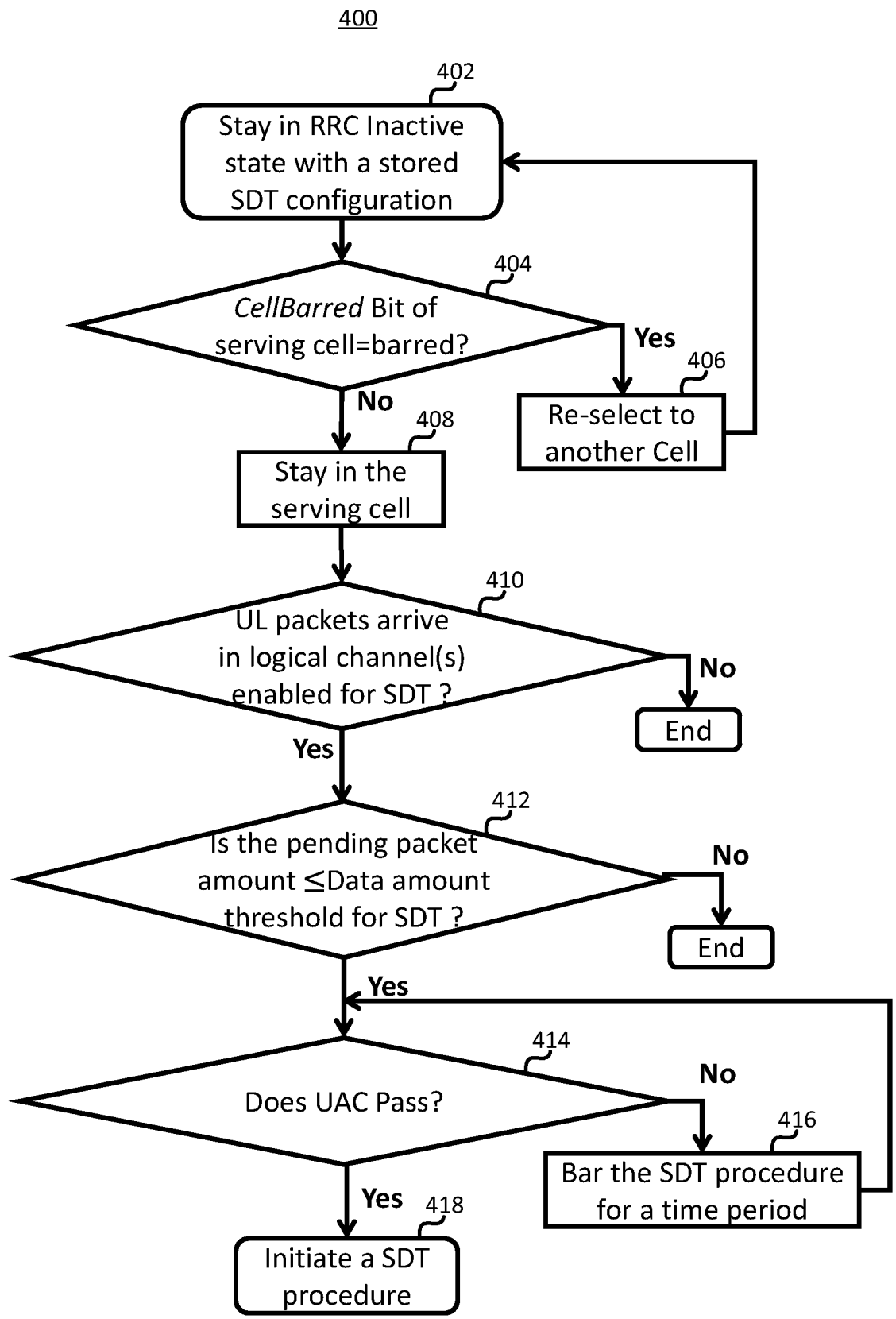
FIG. 4 illustrates a flowchart for a method of access control for SDT, according to an implementation of the present disclosure.

FIG. 4 illustrates a flowchart for a method 400 of access control for an SDT procedure, according to an implementation of the present disclosure. In action 402, the UE is staying in RRC Inactive state with a stored configuration for SDT (e.g., which the UE receives from its serving cell via RRCRelease message reception).

Then, the UE may move in the coverage of a serving radio access network (which is composed of one or more cells. Each cell may be configured and be supported by a base station, such as an NR gNB or E-UTRA eNB). Then, the UE may implement cell a re-selection procedure to select one serving cell with which to camp while the UE moves within the radio coverage of the RAN. In addition, the UE may keep receiving the system information (e.g., MIB, SIB1, SIB2) broadcasted by the same serving cell to monitor the operation status of the serving cell.

In action 404, the UE may check whether the CellBarred bit broadcasted by the serving cell (even the UE may already have stored SDT configuration transmitted by the same serving cell) is set to 'Barred'. In some additional implementations, the UE may also check whether the CellBarred bit broadcasted by its neighbor cell(s) is set to 'Barred' and then the UE would not re-select to a cell which its CellBarred bit is set to 'Barred' during the cell (re)selection procedure.

In action 406, the UE may re-select to another cell as its serving cell if the CellBarred bit of the serving cell shows 'Barred'. In contrast, in action 408, the UE may stay in the (same) serving cell if the serving cell's CellBarred bit shows 'NotBarred'.

In some implementations, the UE may move from an original serving cell (e.g., Cell #1) to a newly selected cell (e.g., Cell #2) after a cell re-selection procedure due to the CellBarred bit of the Cell #1='Barred'. The UE may have stored an SDT configuration configured by the Cell #1. In this condition, the UE may still keep/suspend/retain (at least part of) the stored SDT configuration (e.g., a CG-SDT configuration, which includes the UL-CG configuration for SDT) configured by Cell #1 even if the UE receives the CellBarred bit of Cell #1 of 'Barred', even if (part of) the stored SDT configuration may become invalid when the UE camps to the Cell #2. So, the UE may still have the chance to implement an SDT procedure with the Cell #1 if the UE moves back to camp with Cell #1 again after the UE observes the CellBarred bit of the Cell #1='NotBarred' in the next cell reselection procedure, thereby reducing the signaling overhead. In some other implementations, the UE may release/clear/remove (at least part of) the stored SDT configuration (e.g., CG-SDT configuration, which includes the UL-CG configuration for SDT) configured by Cell #1 when/after the UE re-selects to another cell because of the CellBarred bit of Cell #1 that is set to 'Barred'.

In the block 410, the UE may determine whether UL packets arrive in logical channel(s) enabled for SDT (e.g., by monitoring UL packet arrivals from the upper layers (e.g., application layer, NAS layer) of the UE side). In some implementations, the arrived UL packets may be associated with one or more radio bearers (or RLC bearers) configured by the stored SDT configuration for SDT procedure.

In action 412, the UE may determine whether the total pending data amount of the logical channels (enabled for the SDT procedure) is less than, or equal to, a given data amount threshold for SDT (e.g., included in the SDT configuration). The UE may determine that an SDT procedure could be initiated if the total pending data amount of the logical channels is less than, or equal to, the data amount threshold for SDT.

In action 414, after the UE determines that an SDT procedure could be initiated, the UE may check whether a UAC (mechanism) passes by implementing a UAC procedure (or "UAC mechanism") based on an access category and an access class decided by the UE for the SDT procedure. In some implementations, the access class/access category (e.g., the access class/access category for SDT procedure) may be pre-defined in the 3GPP technical specification and the access class/access category may be pre-installed in the memory or other storage module(s) of the UE. After implementing the UAC mechanism, in action 418, the UE may initiate an SDT procedure (e.g., a CG-SDT procedure or an RA-SDT procedure) if the UE passes the UAC mechanism. On the contrary, in action 416, if the UE does not pass the UAC mechanism, the UE may bar the SDT procedure for a time period (e.g., a backoff period of time), of which the time span may be decided by the UE autonomously based on a given formula implemented in the UAC mechanism.

In some other implementations, the UE may only apply UAC for an RRCResumeRequest procedure (e.g., by reusing the access category for a RRC Resume Request while the UL packet (or uplink transport blocks) is multiplexed with a RRCResumeRequest message for transmission) and the decision may also apply to (small) packet transmission. In other words, there may be no specific UAC mechanism for (small) packet transmission. In some implementations, the UE may implement an access control procedure before an SDT procedure is initiated. In contrast, the UE may not implement the access control procedure during an SDT procedure. The access control procedure may be a common solution for a CG-SDT procedure and an RA-SDT procedure. In some implementations, the UE may implement the access control before the UE decides to apply a CG-SDT procedure or an RA-SDT procedure. After the UE passes the access control, the UE may then decide which type of SDT procedure to apply for packet transmission during the RRC Inactive state. As discussed above, the access control may be a mechanism used to determine whether a UE is allowed to perform a UL data transmission procedure (e.g., SDT procedure) while the UE is in an RRC Inactive state. The UE may be considered passing the access control (e.g., the UE is allowed to perform the UL data transmission procedure) when the UE meets a specific set of conditions that includes, for example, an attempt of a UL data transmission is not barred by the serving cell and an amount of pending UL data to be transmitted is less than or equal to a data volume threshold. In some other implementations, the specific set of conditions may further include the UE passing a UAC mechanism.

Figure 5:
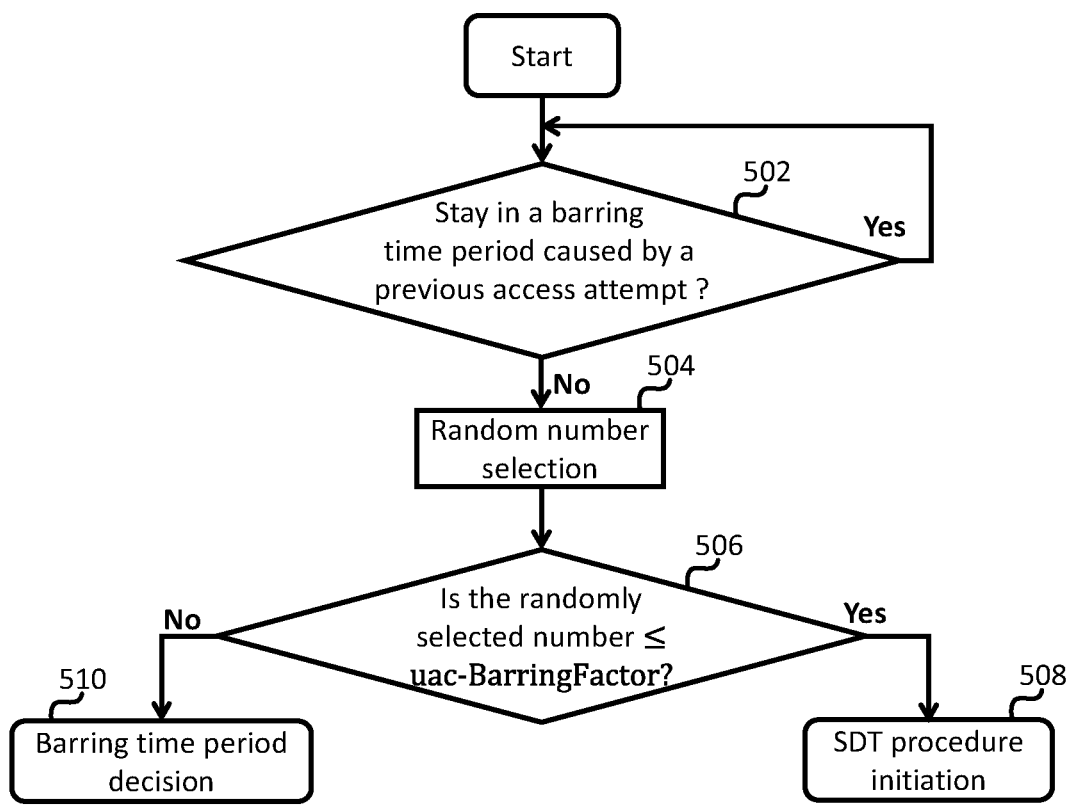
FIG. 5 illustrates a flowchart for a method of performing a Unified Access Control (UAC) mechanism for SDT, according to an implementation of the present disclosure.

FIG. 5 illustrates a flowchart for a method 500 of performing an UAC mechanism for SDT, according to an implementation of the present disclosure. In some implementations, before the method 500 is performed, the UE may have already received one or more configured parameters related to UAC from a serving cell. For example, the serving cell may configure the UE with the parameters related to UAC (e.g., through broadcasting system information) for small packet transmission procedure. In addition, before initiating the SDT procedure for a small packet transmission, the UE may determine whether the pending packets to be transmitted can be transmitted directly through the SDT procedure. In other words, before the UE initiates an SDT procedure for small packet transmission, the UE may implement the UAC mechanism (e.g., as illustrated in FIG. 5) to determine whether the small packets to be transmitted can be transmitted directly through the SDT procedure. The UE may receive from the serving cell an information element 'UAC-BarringInfoSetList' that includes the parameters such as 'uac-BarringForAccessIdentity', 'uac-BarringFactor', and 'uac-BarringTime'. In addition, an access category may be further associated with a specific configuration provided by the serving cell. For example, the association may be determined by allocating a 'UAC-BarringInfoSetIndex' to be associated with a specific 'uac-BarringInfoSetList'. Please also note, the SDT procedure may be a CG-SDT procedure or an RA-SDT procedure (e.g., a 2-step/4-step RA procedure). Please also note, in some implementations, the UE may be configured with different access categories for a CG-SDT procedure or an RA-SDT procedure, respectively. In this condition, the UE may be configured to start one specific first type of SDT procedure first (e.g., a CG-SDT procedure) and so the UE may implement a first UAC mechanism for the first type of SDT procedure. Then, if the first type of SDT procedure is barred by a first UAC result, the UE may consider selecting another type of SDT procedure (e.g., an RA-SDT procedure), and so the UE may implement a second UAC mechanism for the following RA-SDT procedure (e.g., while the CG-SDT procedure is considered barred by the first UAC result).

In action 502, the UE may determine whether the UE has already stayed in a barring time period caused by a previous access attempt with the serving cell, where the previous access attempt happens earlier than an access attempt of the UE to initiate the SDT procedure (e.g., a CG-SDT procedure or an RA-SDT procedure), and the previous access attempt and the access attempt of the UE to initiate the UL data transmission procedure have the same access category (AC) in the UAC mechanism. In some implementations, the previous access attempt may be the UE's previous attempt for SDT procedure initiation (and so, in this condition, the SDT procedure may have already been barred by the UE at least once in the past, and so the UE may need to check whether the barring tine period decided by the last failure attempt has expired or not). In some implementations, the previous access attempt may not be the SDT procedure attempt but another event which shares the same access category (e.g., RRC message delivery) with the SDT procedure in the UAC mechanism.

In the condition while an active barring time period is still counting, the UE may be prohibited from implementing an SDT procedure unless the barring time period decided based on a UAC result of the previous access attempt expires. In some implementations, the UE may be able to initiate another UAC mechanism for the SDT procedure only when the barring time period decided by the previous access attempt expires.

When the barring time period (which has an impact on the SDT procedure) expires, in action 504, the UE may perform random number selection to generate a random number based on the UAC rules. The value of the random number may be in a range between (0,1). Then, in action 506, the UE may determine whether the randomly selected number is less than or equal to uac-BarringFactor. Specifically, based on the access category, the UE may determine whether the UE is barred from small packet transmission by comparing the randomly selected number (determined in action 504) with a specific value (e.g., uac-BarringFactor) received from the serving cell. In a case that the randomly selected number is smaller than (or equal to) the uac-BarringFactor, which means that the SDT procedure is allowed, then in action 508, the UE may initiate an SDT procedure, in which the pending packets of the UE are allowed to be transmitted by the UE in the RRC inactive state. By contrast, if the randomly selected number is larger than the uac-BarringFactor, in action 510, the UE may perform a barring time period decision and consider the SDP procedure to be barred from being performed for the barring time period.

Moreover, if the UE's access attempt is barred, the UE may also determine the time span of the time period during which the small packet transmission is barred by randomly selecting an initial value to the timer T390 based on the following formula:

$$T390=(0.7+0.6+\text{rand})*\text{uac-BarringTime}. \quad (1)$$

Here, rand means a random value selected between the given range (0,1). After determining the initial value of T390, the UE may start to count T390 to zero and the access attempt (for small packet transmission) may be barred before the running T390 expires. After the T390 expires, the UE may implement the UAC mechanism again. Information Element {uac-Barring Factor, uac-BarringTime} for an SDT procedure may be decided by the access category of the SDT procedure (e.g., if it is configured by RAN/CN) or by the access category of RRC message transmission.

In some other implementations, the UE may determine whether the access attempt is barred by comparing a determined Access Identity with the 'uac-BarringForAccessIdentity' from the serving cell. For example, the 'uac-BarringForAccessIdentity' may be a bitmap and each bit in the bitmap is directly mapped to one Access Identity, the access attempt (for small packet transmission) may be allowed if the bit associated with the Access Identity of the UE is set to '0'. Otherwise (e.g., the bit associated with the Access Identity of the UE is set to '1'), the access attempt may be barred to the UE and the UE may implement the access check and start to count T390 to zero.

In some implementations, the UE may determine the Access Identity by a pre-configuration (e.g., the Universal Subscriber Identity Module (USIM) equipped in the UE may indicate which Access Identity that the UE should apply while the UE is triggered to transmit small data packets through an SDT procedure(s)). In some implementations, UE may determine the Access Identity based on the service types (e.g., Multimedia Priority Service (with Access Identity 1) or Mission Critical Service (with Access Identity 2)) associated with the pending packets to be delivered through the SDT procedure.

In some implementations, the UE may only apply UAC for a RRCResumeRequest procedure (e.g., by reusing the access category for RRC Resume Request while the UL packet (or UL TBs) is multiplexed with a RRCResumeRequest message for transmission) and the decision may also apply to (small) packet transmission. In other words, there may be no specific UAC mechanism for (small) packet transmission.

In some aspects of the present disclosure, a UE may not need to implement an Access Barring Check while the UE is triggered to transmit uplink packets through an RA procedure (e.g., an RA-SDT procedure). The RA procedure may be a 2-step RA procedure or a 4-step RA procedure.

In some aspects of the present disclosure, a UE may need not to implement an Access Barring Check (e.g., the method 500 illustrated in FIG. 5) while the UE is triggered to transmit UL packets through a UL-CG configuration (e.g., a CG-SDT procedure).

In some implementations, it is pre-defined (e.g., pre-defined in the technical specification) that the UE need not implement Access Barring Check while the UE wants to transmit uplink packets through an RA procedure.

In some implementations, the UE may also be configured to implement Access Barring Check while an RA procedure is triggered for small packet transmission. In some implementations, there may be a default setting pre-configured to the UE. For example, by default, UEs may implement an Access Barring Check (e.g., as illustrated in FIG. 1) for small packet transmission by an RA procedure. Therefore, explicit signaling (e.g., DL control signaling, DL-RRC signaling or system information) may be configured to the UE to change the default setting. Otherwise, the UE may determine whether to trigger an Access Barring Check based on the default setting, and the serving cell may not deliver DL-control signaling to change the default setting.

In some implementations, the UE may not perform (e.g., skip) the Access Barring Check mechanism while the SDT procedure is triggered for small packet transmission.

In some implementations, the serving cell (e.g., while the UE is staying in an RRC Connected state) may configure the UE whether to skip or perform the Access Barring Check by DL-RRC signaling, such as an RRC (connection) Release message or RRC (connection) Reconfiguration message.

In some other implementations, the serving cell (e.g., while the UE is staying in the RRC connected state, RRC inactive state, or RRC idle state) may configure the UE to skip/implement the Access Barring Check by system information delivery. The serving cell may transmit the system information to UE(s) through a broadcasting approach or the UE-specific DL control signaling (e.g., DL-RRC signaling, such as an RRC (connection) Reconfiguration message). In some additional implementations, the UE may be configured (e.g., by UE DL RRC signaling) to skip the Access Barring Check (mechanism) for an CG-SDT procedure or an RA-SDT procedure. Once the Access Barring Check is skipped, the UE does not perform the Access Barring Check.

In some implementations, the UE may be pre-configured (e.g., the pre-configuration may be stored in the memory module of the UE side) to skip performing the Access Barring Check mechanism for small packet transmission. In some additional implementations, the UE may be pre-configured to skip the Access Barring Check mechanism for a CG-SDT procedure or an RA-SDT procedure.

In some aspects of the present disclosure, a UAC mechanism for (small packet transmission) may be performed before the CG-SDT procedure or through the UL-CG procedure.

For example, an UAC-like mechanism may be applied to the UE while the UE wants to transmit small packets through one or more UL-CG configurations. In other words, if the UAC result to the UE is barred, the UE is not allowed to implement/perform (small) packet transmission through the stored UL-CG configuration(s). The UL-CG transmission may also be barred while the backoff timer (e.g., T390) is counting. The initial value of the T390 may also be part of the UAC result.

In some implementations, the UE that attempts to transmit the (small) packet(s) through a pre-configured UL-CG configuration may be regarded as generating an access attempt. Therefore, the UAC mechanism may be reused if the UE (e.g., in the RRC inactive state or RRC idle state) attempts to transmit packets through the pre-configured one or more UL-CG configurations.

In some implementations, whether the UE needs to implement UAC for small packet transmission by accessing a UL-CG configuration may be configurable.

In some implementations, the UAC mechanism applied for an RA procedure may not be applied to (small) packet transmission through the UL-CG configuration. In such a situation, the UE may still be able to transmit (small) packet through a stored UL-CG configuration while the UAC result (e.g., associated with an RA-SDT procedure) is 'barred' and the backoff timer (e.g., T390) is still running/counting.

In some implementations, if the UE considers that the access attempt associated with the serving cell is barred (e.g., due to UAC decision derived by other events, such as an RNAU procedure or while the UE is triggered (by upper layers) for a new service request), the UE may also be directly disabled from (small) packet transmission through an RA procedure during the time period that the UE is barred to initiate another access attempt (e.g., the SDT procedure, which may be a CG-SDT procedure or an RA-SDT procedure) to its serving cell. In some other implementations, the barring condition (e.g., the SDT procedure is impacted by a previous event) may happen only when the SDT procedure and the other event belong to the same access category in the UAC mechanism.

In some implementations, the UE may consider that the cell is barred for a time period (e.g., by referring the running T390). Then, the UE is prohibited to initiate an RA procedure for small packet transmission (e.g., a 2-step RA procedure or a 4-step RA procedure) before the running T390 expires. In other words, the UE may initiate an RA procedure for small packet transmission (only) after the counting T390 expires.

In some implementations, the UE may initiate an RA procedure (e.g., a 2-step RA procedure or a 4-step RA procedure) for small packet transmission without being impacted by the previous UAC decision (e.g., even if the UE is still barred from initiating an RA procedure for an RNAU procedure). In other words, the access attempt(s) for small packet transmission may be independent for each RRC procedure (e.g., an RRC Resume procedure), and thus the UE may implement another UAC mechanism for (small) packet transmission and the UE may determine whether (small) packet transmission through an RA procedure is permitted or barred by only considering the UAC decision triggered for small packet transmission.

In addition, the initiation of RA procedure for (small) packet transmission may not impact the counting period that the UE considers it is 'barred' from initiating an RA procedure for one RRC procedure (e.g., an RNAU procedure).

In such a situation, the pending RRC Resume Request message (if there are any) may not be allowed to be multiplexed with the small packet before the counting T390 (e.g., which is generated while the access attempt for RNAU procedure is barred) expires.

In some implementations, the UE may be configured with prioritized RA parameters (e.g., as the RA-Prioritization configuration in TS 38.331) for (small) packet transmission through an RA procedure. For example, the UE may be configured with at least one of the parameter PowerRampingSetupHighPriority, the parameter ScalingFactorBI, the parameter Preamblereceivedtargetpower, and the parameter PreambleTransMax:

PowerRampingSetupHighPriority=ENUMERATED {dB0, dB2, dB4, dB6}. The PowerRampingSetupHighPriority defines the ramping step applied for prioritized RA procedure. Here, the dB0 means 0 dB in each power ramping step and dB2 means 2 dB in each ramping step and so on. In the present disclosure, "ENUMERATED { . . . }" represents a data type that consists of a set of named values (e.g., dB0, dB2, dB4, and dB6 in the example above), which is defined by Abstract Syntax Notation One (ASN.1).

ScalingFactorBI=ENUMERATED {zero, dot25, dot5, dot75}. The ScalingFactorBI defines the scaling factor for the backoff indicator for the prioritized RA procedure (e.g., as shown in the 3GPP TS 38.321). Here, the value zero corresponds to 0, value dot25 corresponds to 0.25 and so on.

Preamblereceivedtargetpower=INTEGER (−202 . . . 60). This parameter defines the target power level at the network receiver side.

PreambleTransMax=ENUMERATED {n3, n4, n5, n6, n7, n8, n10, n20, n50, n100, n200}. This parameter defines the maximum number of RA preamble transmissions performed before declaring a failure.

In some implementations, the RA-Prioritization configuration for (small) packet transmission (e.g., RA-prioritization_ULPacket) may be configured to the UE through dedicated UE-specific control signaling (e.g., an RRCReconfiguration message, an RRCRelease message) or broadcasting system information, or through SI delivery through UE-specific control signaling, or through an SI on-demand procedure. In some implementations, the prioritized RA parameters may be configured via an RRCRelease (e.g., with (RRC configuration) suspend instruction or suspend configuration) message. In some implementations, the prioritized RA parameters may be included in the configuration for SDT. In some implementations, a UE may only apply prioritized RA parameters only if the UE has been configured with prioritized RA parameters for (small) packet transmission and the UE has satisfied the conditions to initiate an RA procedure for (small) packet transmission. In an implementation, the condition to initiate an RA procedure for (small) packet transmission may be due to incoming UL data while the UE is in RRC_INACTIVE state, and the UL data available for transmission plus MAC header and, where required, MAC control elements, is smaller (or larger) than a data threshold indicated by the network.

In some implementations, the configured parameter RA_prioritization_ULPacket may be generally applied to a 4-step RA procedure and a 2-step RA procedure. In some other implementations, the RA_prioritization_ULPacket may only be applied to a 4-step RA procedure. Another parameter set 'RA_Prioritization_ULPacket-2step' may also be configured to the UE for (small) packet transmission through a 2-step RA procedure. The RA_prioritization_ULPacket and RA_prioritization_ULPacket-2step may be configured to the UE jointly through the same approach. In some other implementations, the RA_prioritization_UL- Packet and RA_prioritization_ULPacket-2step may be configured to the UE separately through the different approaches.

In some implementations, RA_prioritization_ULPacket configurations associated with different Access Identities and/or different access categories may be delivered to the UE(s) (e.g., through UE-specific RRC signaling or through (broadcast) system information). The UE may apply the RA_prioritization_ULPacket configuration associated with the corresponding the Access Identity (and/or) access category of the (small) packet transmission through the (2-step/4-step) RA procedure. In some implementations, an access identity bitmap (e.g., Access_Identity_Bitmap) may be configured to be associated with an RA_prioritization_ULPacket configuration, and each bit in the Access_Identity_Bitmap may be pre-defined to be associated with one corresponding Access Identity. In some implementations, the serving cell may configure one Access Identity with RA prioritization by setting the corresponding bit in the bitmap to '1'. Otherwise (e.g., no RA prioritization for the Access Identity), the serving cell may configure the corresponding bit to '0'.

A similar approach may be applied to the RA prioritization for different access categories. For example, one Access_Category_Bitmap may be configured to be associated with one RA_prioritization_ULPacket configuration, where each bit in the Access_Category_Bitmap may be pre-defined to be associated with one corresponding access category. In some implementations, the serving cell may configure one access category with RA prioritization by setting the corresponding bit in the bitmap to '1'. Otherwise (e.g., no RA prioritization for the access category), the serving cell may configure the corresponding bit to '0'. In some implementations, the Access_Category_Bitmap may be replaced by a Boolean sequence.

In some implementations, there is one bit (e.g., RA_prioritization_up bit) or one Boolean value to be configured to be associated with an RA prioritization configuration. The serving cell may configure the UE to prioritize an RA procedure (for small packet transmission) by setting the RA_prioritization_up bit='1' (or 'true'). After receiving the configuration, the UE may apply the RA prioritization configuration during the RA procedure (for small packet transmission) if the RA_prioritization_up='1' or 'true'. Otherwise (e.g., the RA_prioritization_up is '0' or 'false' or it is not configured by the serving cell), the UE may not apply the RA prioritization configuration during the RA procedure (for small packet transmission). In some implementations, the RA_prioritization_up bit may cover both 4-step and 2-step RA procedure (for small packet transmission). In some other implementations, the RA_prioritization_up bit may only cover 4-step RA procedure (for small packet transmission).

In some other implementations, another bit (or Boolean value), such as RA_prioritization_up-2step, may also be configured to be associated with the RA prioritization configuration (e.g., RA_prioritizationTwoStep, which defines the power ramping factor and Backup Indicator (BI) scaling factor for the UE to perform a (prioritized) 2-step RA procedure). The RA_priotization_up-2step is configured to enable/disable the UE to apply the RA prioritization configuration while the UE is performing (small) packet transmission through the 2-step RA procedure. After receiving the configuration, the UE may apply the RA prioritization configuration during the 2-step RA procedure (for small packet transmission) if the RA_prioritization_up='1' or 'true'. Otherwise (e.g., the RA_prioritization_up is '0' or 'false' or it is not configured by the serving cell), the UE may not apply the RA prioritization configuration (e.g., RA_prioritizationTwoStep) during the 2-step RA procedure (for small packet transmission).

In some implementations, at least one of the parameter RA_prioritization_ULPacket configuration and the parameter RA_prioritization_ULPacket-2step configuration may be associated with different logical channels (LCH) which initiate an RA procedure. For example, upon initiation of a 4-step RA procedure, the UE may apply the RA_prioritization_ULPacket configuration associated with the corresponding LCH which has pending UL data for SDT. In another example, upon initiation of a 2-step RA procedure, the UE may apply the RA_prioritization_ULPacket-2step configuration associated with the corresponding LCH which has pending UL data for SDT.

In some cases, a UE may receive two configurations for the same purpose (e.g., the RA_prioritization_ULPacket configuration and the RA_prioritization_ULPacket-2step configuration) through the system information broadcast by the network and/or through the UE-specific dedicated control signaling (e.g., UE-specific (DL) RRC signaling), respectively. In such a situation, the configuration(s) received through the UE-specific dedicated control signaling may have a higher priority. The UE may apply the configurations received through the UE-specific RRC signaling rather than the configurations received through the (broadcasting) system information. In some implementations, the UE may apply the configurations received through (broadcasting) system information while the configurations received through the UE-specific RRC signaling are removed (or are invalid).

In some implementations, the UE may reuse the existing signaling and RA prioritization approach by reusing the existing mechanisms. It means that the existing RA prioritization indications (and rules) may be applied to the UE to implement (small) packet transmission through a (2-step/4-step) RA procedure. A UE may be configured with a different RA_prioritization_ULPacket configuration for (small) packet transmission on SUL or UL component carrier respectively. In some implementations, different RA prioritization parameters may be configured to be associated with different logical channels (or different RLC bearers) for small packet transmissions. So, while the UE initiates an RA procedure for (small) packet transmissions, the UE may determine the RA prioritization parameters based on the corresponding logical channels (e.g., on which the pending packets are multiplexed for transmission). The UE may determine the RA prioritization parameters based on the priority of the corresponding logical channels (e.g., the priority of the corresponding logical channel configured, which may be configured in the SDT configuration).

The concept of power ramping may also be applied to the (small) packet transmission through the stored UL-CG configuration. For example, the parameter "PowerRamping_CG" may be configured to the UE for (small) packet transmission through UL-CG configuration. Every time the UE receives one HARQ NACK message (and/or DTX, which means the UE does not receive a HARQ feedback message from the serving cell after packet transmission through the stored UL-CG configuration) from the serving cell, the UE may increase the Transmit (Tx) power in the next transmission one step further based on the parameter PowerRamping_CG. The power ramping procedure may be done continuously until the UE reaches the maximum number of UL packet re-transmissions or reaches the maximum threshold of UL Tx power.

In some aspects of the present disclosure, a UE may be configured with at least one data volume threshold ($D_{Low}$) for the UE to determine whether to initiate an RA procedure (e.g., a 2-step/4-step RA procedure) and/or access one (or more) UL-CG configuration(s) for small packet transmission. The UE may receive the value of $D_{Low}$ from at least one of broadcasting system information with/without SI on-demand procedure; UE-specific dedicated control signaling (e.g., an RRCRelease message with suspend configuration or an RRCReconfiguration message); pre-defined in technical specification or pre-installed in the USIM; physical control signaling (e.g., DCI); and MAC control element. In some implementations, the $D_{Low}$ may be specified in some unit, such as bytes or bits. In some implementations, the value of $D_{Low}$ may be part of the SDT configuration transmitted by the serving cell via an RRCRelease message.

In some implementations, the UE may calculate the total pending data amount by only considering the logical channels enabled/allowed/configured for an SDT procedure. In addition, the UE may calculate the pending data amount of one logical channel based on the conventional approach when the UE is calculating the buffer status of one logical channel (e.g., by referring to 3GPP TS 38.322 and TS 38.323). The pending data amount of all of the Data Radio Bearer(s) (DRB(s)) and all of the Signaling Radio Bearer(s) (SRB(s)) enabled for SDT may be considered jointly for the access control mechanism while one or more DRB(s)/SRB(s) are enabled for the SDT procedure. In some additional implementations, the pending amount of all of the DRB(s) enabled for SDT may be counted independently from the pending amount of all of the SRB(s) enabled for SDT, and independent data volume thresholds ($D_{Low}$), where one is configured for the pending data amount for DRB(s) and another one is configured for the pending data amount for SRB(s), may be configured to the UE. In this condition, action 506 in FIG. 5 may be implemented only for DRB(s) or only for SRB(s).

In some implementations, the $D_{Low}$ and the access control may be UE-specific. For example, in the MAC entity, the UE may measure/evaluate/calculate/estimate the total amount pending packets (e.g., the total TBs which are allowed to be transmitted through the proposed small packet transmissions) and compare the total amount with $D_{Low}$. The UE may be allowed (or be enabled/configured) to initiate a (2-step/4-step) RA procedure (or one UL-CG access attempt to access the UL-CG configuration(s)) for small packet transmission if the amount of pending packets is larger than (or equivalent to) the $D_{Low}$. Otherwise (e.g., the total amount of pending packets which are allowed to be transmitted through the proposed small packet transmissions in the MAC entity is smaller than $D_{Low}$), the UE may not be allowed to initiate a (2-step/4-step) RA procedure (or an UL-CG access attempt) for small packet transmission.

By contrast (e.g., the total amount of pending packets in the MAC entity is less than (or equivalent to) $D_{Low}$), the UE is not allowed to initiate a (2-step/4-step) RA procedure (and/or an UL-CG access attempt) for small packet transmission. The pending packets may still be able to be transmitted through an RA procedure (or UL-CG access attempt) initiated by other triggering events.

In some implementations, the UE may still be able to transmit pending packets (even the total pending data amount is less than (or equivalent to) $D_{Low}$) if the RA procedure or UL-CG access attempt is triggered due to other events. For example, the UE may still be able to multiplex pending packets with an RRCResumeRequest message for small packet transmissions while the RA procedure (or UL-CG access attempt) is triggered by RRC signaling transmission.

In some implementations, a UE may not be configured with $D_{Low}$ (or be set to zero, '0'). It may represent that the UE is enabled to initiate an RA procedure (and/or an UL-CG access attempt) while there are any new data packets arriving at the MAC entity of the UE from the upper layers (e.g., the RLC layer) of the UE. In some other implementations (e.g., $D_{Low}$ is not configured or $D_{Low}$ is set to be a very large value, such as infinite), it means that the MAC entity may always disabled from initiating an RA procedure (and/or an UL-CG access attempt) directly (e.g., in other words, the pending packets of the logical channel may only be multiplexed with RRC signaling while an RA or a UL-CG access attempt is initiated).

In some implementations, $D_{Low}$ may be associated with a logical channel (or associated with a radio bearer, such as a DRB or an SRB). In the MAC entity, the UE may measure/evaluate/calculate/estimate the total amount of pending packets of one logical channel (which the packets associated with the logical channel are allowed to be transmitted while the UE is staying in the RRC Inactive state). Then, the UE may be allowed to initiate a (2-step/4-step) RA procedure (or an UL-CG access attempt) for small packet transmission if the amount of pending packets in one (or more) considered logical channels (e.g., the logical channel which is configured with $D_{Low}$) is larger than (or equivalent to)/smaller than (or equivalent to) $D_{Low}$.

By contrast (e.g., there is no considered logical channel in which the amount of pending packets is larger than (or equivalent to) $D_{Low}$), the UE may not be allowed to initiate a (2-step/4-step) RA procedure (or a UL-CG access attempt) for small packet transmission. However, please also note that these pending packets may still be transmitted through an RA procedure (or an UL-CG access attempt) initiated by other triggering events.

In some implementations, the UE may still be able to transmit pending packets of a logical channel (e.g., LCH #1, even if the pending data amount of the LCH #1 less than the associated $D_{Low}$) if the RA procedure or UL-CG access attempt is triggered due to other events.

For example, the UE may be able to multiplex pending packets of the logical channel (e.g., LCH #1) with RRC control signaling (e.g., an RRCResumeRequest message) for small packet transmissions while the RA procedure (or UL-CG access attempt) is triggered by RRC signaling transmission. For example, the UE may be able to multiplex pending packets of the LCH #1 with the pending packets of other logical channel(s) (e.g., LCH #2) if the RA procedure (or UL-CG access attempt) is triggered by the LCH #2 (e.g., the pending data amount of LCH #2 is larger than the $D_{Low}$ associated with LCH #2).

In some implementations, a logical channel may not be configured with $D_{Low}$ (or be set to zero, '0'). This case may represent that the UE is enabled to initiate an RA procedure (and/or an UL-CG access attempt) while a new data packet arrives to the logical channel from the upper layers (e.g., the RLC layer). In some other implementations (e.g., $D_{Low}$ is not configured or $D_{Low}$ is set to a very large value, such as infinite), it means that the UE is always disabled from initiating an RA procedure (and/or an UL-CG access attempt) directly (e.g., in other words, the pending packets of the logical channel could only be multiplexed with the packets of other logical channels while an RA or a UL-CG access attempt is initiated).

In some implementations, the $D_{Low}$ may be associated with one logical channel group (e.g., one logical channel group may be configured by the serving cell to include one or more logical channels). In the MAC entity of the UE, the UE may measure/evaluate/calculate/estimate the total amount of pending packets of one logical channel group (which the packets associated with the logical channel are allowed to be transmitted while the UE is staying in the RRC Inactive state). Then, the UE may be allowed to initiate a (2-step/4-step) RA procedure (or a UL-CG access attempt) if the total number of pending packets in one (or more) considered logical channel group (e.g., the logical channel which is configured with $D_{Low}$) is larger than (or equivalent to)/smaller than (or equivalent to) the $D_{Low}$.

By contrast (e.g., there is no considered logical channel group in which the total number of pending packets is larger than (or equivalent to) $D_{Low}$ associated with the considered logical channel group), the UE may not be allowed to initiate a (2-step/4-step) RA procedure (and/or a UL-CG access attempt) for small packet transmission. The pending packets may still be able to be transmitted through an RA procedure (or a UL-CG access attempt) initiated by other triggering events.

In some implementations, the UE may still be able to transmit pending packets of a logical channel group (e.g., LCG #1, even if the pending data amount of the LCG #1 is less than the associated $D_{Low}$) if the RA procedure or UL-CG access attempt is triggered due to other events. For example, the UE may still be able to multiplex pending packets of the logical channel (e.g., LCH #1) with an RRCResumeRequest message for small packet transmissions while the RA procedure (or UL-CG access attempt) is triggered by RRC signaling transmission. For example, the UE may still be able to multiplex pending packets of the LCG #1 with the pending packets of other logical channel(s) (e.g., LCG #2) if the RA procedure (or UL-CG access attempt) is triggered by the LCG #2 (e.g., the pending data amount of LCG #2 is larger than the $D_{Low}$ associated with LCG #2).

In some implementations, a logical channel group may not be configured with $D_{Low}$ (or be set to zero, '0'). It may represent that the UE is enabled to initiate an RA procedure (and/or an UL-CG access attempt) while a new data packet arrives to the logical channel from the upper layers (e.g., the Radio Link Control (RLC) layer). In some other implementations (e.g., $D_{Low}$ is not configured or $D_{Low}$ is set to a very large value, such as infinite), it means that the UE is always disabled from initiating an RA procedure (and/or an UL-CG access attempt) directly (e.g., in other words, the pending packets of the logical channel group could only be multiplexed with the packets of other logical channel group(s) while an RA or a UL-CG access attempt is initiated).

In some implementations, the logical channel group is defined by reusing the logical channel group of buffer status reporting. In some other implementations, the serving cell may configure specific logical channel groups for the measurement of a pending packet amount. In addition, the UE may receive the LCG configuration through RRC signaling (e.g., in the suspend configuration in the RRCRelease message).

In some implementations, different $D_{Low}$ values may be configured to the UE. For example, the $D_{Low}$ values to each UE/logical channel/logical channel group may be different. For example, different $D_{Low}$ values may be configured to one UE for the UE to determine whether to initiate a 4-step RA procedure/2-step RA procedure/UL-CG access attempt. For example, different $D_{Low}$ values may be configured to be associated with different RACH resource configurations, which may cover the normal uplink carrier and supplementary uplink carrier. For example, different $D_{Low}$ values may be configured to be associated with different UL-CG configurations, which may cover the normal uplink carrier and supplementary uplink carrier.

As discussed in the present disclosure, solutions for the UE to implement (small) packet transmission while the UE is staying in an RRC inactive state (or RRC idle state) are provided. The UE described in the present disclosure may implement any combinations of the mechanisms/methods described in the present disclosure. The described parameters in the present disclosure may be considered as part of a UL-CG configuration or a physical resource configuration of an RA procedure for (small) packet transmission while the UE is staying in an RRC inactive state. The parameters may also be area-specific, which may be configured with one validity area along with the UL-CG configuration or the physical resource configuration of the RA procedure.

In some implementations, (any subsets of) the parameters or configurations (e.g., the UL-CG configuration, RACH resource configuration for small packet transmission and/or the proposed parameters in the present disclosure) which the UE is configured for small packet transmission may be maintained after the UE transitions from an RRC Inactive state to an RRC connected state. Moreover, the stored parameters or configurations may still be valid for small packet transmissions while the UE switches from an RRC connected state to an RRC inactive state again (e.g., if the serving cell does not instruct the UE to release the stored parameters/configurations and/or the serving cell does not transmit new parameters/configurations for the UE to replace the stored parameters/configurations). In some implementations, the described mechanisms may be applied to mobility events in different RRC states, such as a cell (re)selection procedure or a (conditional) handover procedure. Moreover, in some implementations, the stored parameters/configurations may be valid in a UE-specific/cell-specific area, which may be defined by at least one cell identity, physical cell identity (PCI), RAN area ID, RAN Notification Area Code (RNAC), Tracking Area Code (TAC), or System information Area ID (e.g., System information Area ID). In some implementations, the stored parameters/configurations may be removed (or released) by the UE automatically while the UE leaves the valid area associated with the stored parameters/configurations due to mobility events in different RRC states (e.g., cell (re-) selection, handover, conditional handover, RRC (re-)establishment procedure). In some implementations, the stored parameters/configurations may be released due to the UE moving to another RAT (e.g., E-UTRA) or changing the SNPN Access Mode (e.g., when the UE moves to SNPN access mode or leaves SNPN access mode).

In some implementations, different combinations of the described implementations may be created to formulate a two-layer (or multi-layer) access control mechanisms for small packet transmissions (e.g., while the UE is staying in RRC inactive state).

Figure 6:
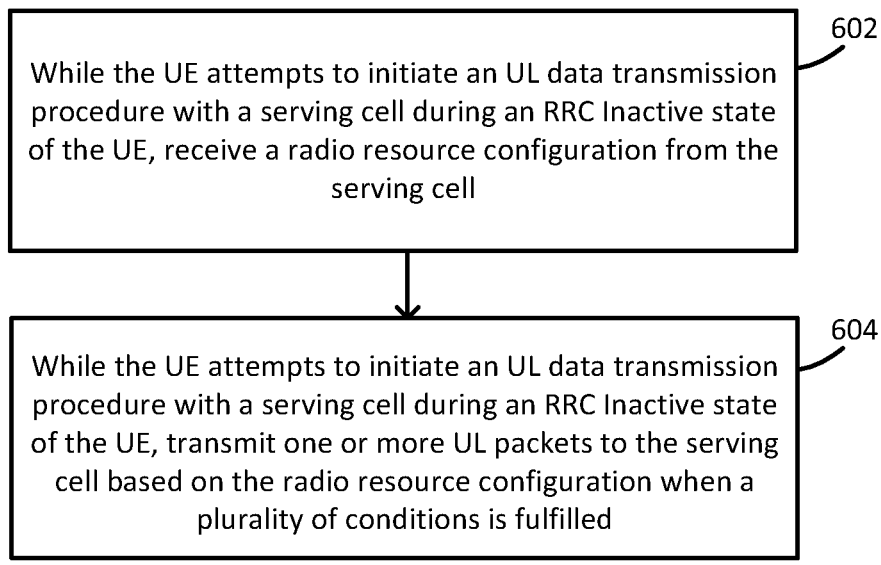
FIG. 6 illustrates a flowchart for a method performed by a UE for access control, according to an implementation of the present disclosure.

FIG. 6 illustrates a flowchart for a method 600 performed by a UE for access control, according to an implementation of the present disclosure. Although actions 602 and 604 are illustrated as separate actions represented as independent blocks in FIG. 6, these separately illustrated actions should not be construed as necessarily order dependent. The order in which the actions are performed in FIG. 6 is not intended to be construed as a limitation, and any number of the disclosed blocks may be combined in any order to implement the method, or an alternate method. Moreover, each of actions 602 and 604 may be performed independently of other actions and may be omitted in some implementations of the present disclosure.

In action 602, while the UE attempts to initiate a UL data transmission procedure with a serving cell during an RRC inactive state of the UE, the UE may receive and store a radio resource configuration from the serving cell (e.g., while the UE is staying in the RRC Connected state with the serving RAN, which may be an E-UTRAN or an NR-RAN). Then, after the UE moves to the (LTE/NR) RRC Inactive state, the UE may be able to initiate a UL data transmission procedure with the serving RAN based on the stored radio resource configuration. For example, the UE may initiate the UL data transmission procedure to perform (small) packet transmission in the RRC inactive state.

In action 604, while the UE attempts to initiate a UL data transmission procedure with a serving cell during an RRC inactive state of the UE, the UE may transmit one or more UL packets to the serving cell based on the radio resource configuration when a plurality of conditions is fulfilled. In other words, the UE is allowed to perform the UL data transmission procedure if the plurality of conditions is fulfilled. The plurality of conditions may include an attempt of a UL data transmission is not barred by the serving cell, and an amount of pending UL data to be transmitted is less than or equal to a data volume threshold.

In some implementations, the UL data transmission procedure is an RA procedure (e.g., a 2-step/4-step RA procedure) triggered by the UE based on the radio resource configuration.

In some implementations, the UL data transmission procedure may include (the UE) accessing at least one UL-CG based on a UL-CG configuration pre-configured by the serving cell via UE-specific control signaling.

In some implementations, the attempt of the UL data transmission may be barred in a case that the UE receives, from the serving cell, system information including a cell-barred bit (e.g., the CellBarred bit described above) that indicates the serving cell is barred or the access attempt associated with the serving cell (e.g., the SDT procedure or another access attempt which might have the same access category as the SDT procedure) is barred during a barring (time) period determined by the UE based on a result of a UAC mechanism. Once the UE's attempt of the UL data transmission is barred, it means that the UE is barred from performing the UL data transmission even though the UE has pending packet(s) to be transmitted and attempts to transmit the pending packet(s).

In some implementations, the UAC mechanism may be implemented by (or "performed by") the UE for the UL data transmission procedure (e.g., the SDT procedure or an access attempt with the serving cell, such as initial access attempt) based on an access category associated with the UL data transmission procedure. In some implementations, the UE may implement/perform the UAC mechanism by comparing a randomly selected number with a specific value (e.g., uac-BarringFactor) received from a serving cell (e.g., as illustrated in FIG. 5). If the randomly selected number is smaller than (or equal to) the specific value, the UE passes the test of the UAC and the UL data transmission procedure is considered allowed to be performed. If the randomly selected number is larger than the specific value, the UE does not pass the test of the UAC and the UL data transmission procedure is barred for a period of time, of which the time span may be determined by the UE randomly within a given range as part of the UAC mechanism.

In some implementations, the UE may not perform another UAC mechanism for the access attempt of the UL data transmission procedure until the barring time period elapses.

In some implementations, the UE may receive the data volume threshold via UE-specific RRC signaling or via broadcasting system information.

In some implementations, the UE may determine the amount of pending UL data (e.g., the total number of pending packets at the UE) by only considering pending data in all of a plurality of logical channels allowed by the serving cell for UL data transmission during the RRC Inactive state.

Figure 7:
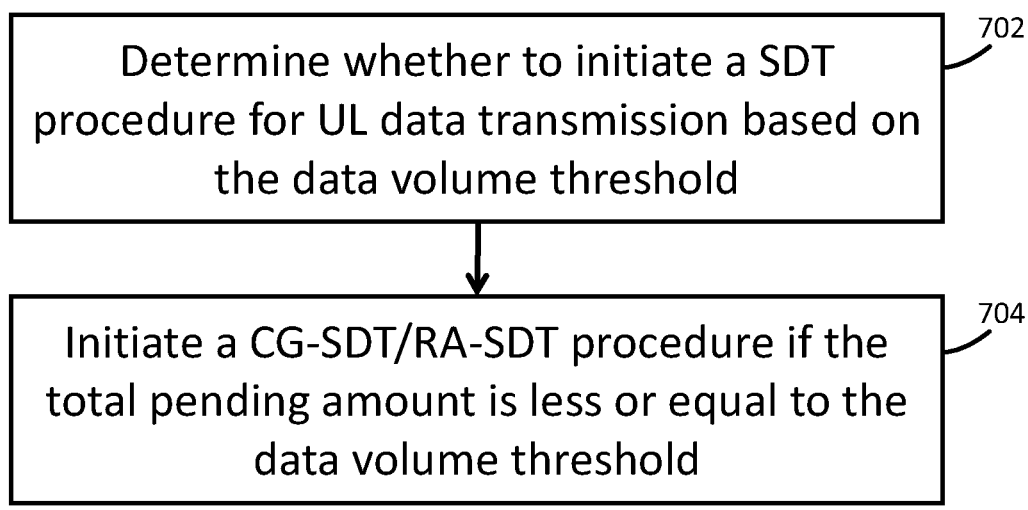
FIG. 7 illustrates a flowchart for a method for access control, according to an implementation of the present disclosure.

FIG. 7 illustrates a flowchart for a method 700 for access control, according to an implementation of the present disclosure. The method 700 may be performed independently of, or in combination with, other methods illustrated in the present disclosure.

In action 702, the UE may determine whether to initiate an SDT procedure for UL data transmission based on the data volume threshold.

In action 704, the UE may initiate a CG-SDT/RA-SDT procedure if the total pending amount is less (or equivalent) to the data volume threshold.

Figure 8:
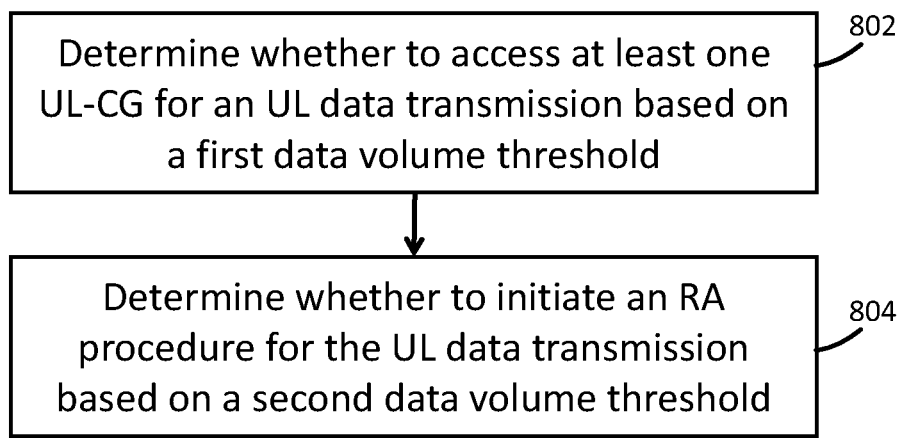
FIG. 8 illustrates a flowchart for a method for access control, according to an implementation of the present disclosure.

FIG. 8 illustrates a flowchart for a method 800 for access control, according to an implementation of the present disclosure. The method 800 may be performed independently of, or in combination with, other methods illustrated in the present disclosure.

In action 802, the UE may determine whether to access at least one UL-CG for a UL data transmission (or a UL data transmission procedure) based on a first data volume threshold. For example, the UE may determine whether to initiate a CG-SDT procedure (e.g., by accessing the at least one UL-CG stored in the SDT configuration) for UL data transmission based on the first data volume threshold. In some implementations, the UE may decide not to initiate a CG-SDT procedure in action 802 if at least one of the following events (1) and (2) happens:

(1) The pending data amount is larger than (or equal to) the stored first data volume threshold (e.g., configured for a CG-SDT procedure).

(2) There is no suitable UL-CG resource configuration for an SDT procedure (e.g., the UE performs a DL-RSRP measurement associated with the stored UL-CG configurations (e.g., by measuring the DL-SSB sets associated with the UL-CG configuration) and the measurement results of the UL-CG configuration are lower than a given DL-RSRP threshold associated with the UL-CG configuration).

In some other implementations, a CG-SDT procedure may be initiated in action 802 but the initiated CG-SDT procedure may fail (e.g., the UE re-selects to another cell during the CG-SDT procedure, ARQ re-transmission number (of one RLC packet) reaches a maximum threshold during the CG-SDT procedure, the TAT_Inactive associated with the CG-SDT procedure expires). Then, in this condition, the UE may also move to action 804.

In action 804, the UE may determine whether to initiate an RA procedure for the UL data transmission based on a second data volume threshold. For example, the UE may determine whether to initiate an RA-SDT procedure if the total pending amount is less than (or equivalent to) the second data volume threshold. In some implementations, the first data volume threshold and the second data volume threshold are configured to the UE independently. In some other implementations, the first data volume threshold and the second data volume threshold may be the same data volume threshold in the SDT configuration. In some implementations, the UE may only need to implement one access control mechanism in action 802 (to decide whether to initiate a CG-SDT procedure based on the result of the proposed access control mechanisms). In addition, the UE may skip the access control mechanisms in action 804 if the UE already passes in action 802. In other words, the UE does not apply access control mechanisms for the RA-SDT procedure if the RA-SDT procedure is triggered after a failed CG-SDT procedure or after a barred CG-SDT access attempt.

The following may be used to further disclose terms, examples, embodiments, implementations, actions, and/or behavior:

The terms network (NW), Radio Access Network (RAN), cell, camped cell, serving cell, base station, gNB, eNB and ng-eNB may be utilized interchangeably in the present disclosure. In addition, some of the terms may refer to the same network entity.

Serving Cell: For a UE in RRC_CONNECTED (i.e., in an RRC connected state) not configured with CA/DC there is only one serving cell comprising of the primary cell. For a UE in RRC_CONNECTED configured with CA/DC the term 'serving cells' is used to denote the set of cells comprising of the Special Cell(s) and all secondary cells.

Special Cell: For Dual Connectivity operation the term Special Cell refers to the PCell of the MCG or the PSCell of the SCG, otherwise the term Special Cell refers to the PCell.

The proposed mechanism may be applied to any RAT. The RAT may be (but not limited to) NR, NR-U, LTE, E-UTRA connected to 5GC, LTE connected to 5GC, E-UTRA connected to EPC, and LTE connected to EPC. The proposed mechanism may be applied for UEs in public networks, or in private network (e.g., NPN (non-public network, SNPN (standalone NPN), PNI-NPN (public network integrated NPN)).

The mechanisms described in the present disclosure may be applied to the licensed frequency and/or unlicensed frequency.

System information (SI) may refer to MIB, SIB1, and other SI. Minimum SI may include MIB and SIB1. Other SI may refer to SIB3, SIB4, SIB5, and other SIB(s) (e.g., SNPN-specific SIB, PNI-NPN-specific SIB).

Dedicated signaling may refer to (but not limited to) RRC message(s). For example, RRC (Connection) Setup Request message, RRC (Connection) Setup message, RRC (Connection) Setup Complete message, RRC (Connection) Reconfiguration message, RRC Connection Reconfiguration message including the mobility control information, RRC Connection Reconfiguration message without the mobility control information inside, RRC Reconfiguration message including the configuration with sync, RRC Reconfiguration message without the configuration with sync inside, RRC (Connection) Reconfiguration complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC System Information Request message, UE Assistance Information message, UE Capability Enquiry message, and UE Capability Information message. RRC message may be one kind of dedicated signaling. The UE may receive the RRC message from the network via unicast/broadcast/groupcast.

The RRC_CONNECTED UE (i.e., a UE in an RRC connected state), RRC_INACTIVE UE (i.e., a UE in an RRC inactive state), and RRC_IDLE UE (i.e., a UE in an RRC idle state) may apply the implementations described in the present disclosure.

An RRC_CONNECTED UE may be configured with an active BWP with common search space configured to monitor system information or paging.

The described mechanism may be applied for the PCell and the UE. In some implementations, the described mechanism may be applied for the PSCell and the UE. The short message and/or paging DCI may be transmitted by the PSCell (or secondary node) to the UE. The UE may monitor the PDCCH monitoring occasions for paging configured by the PSCell (or secondary node).

In the presented implementations, if the UE considers itself barred by a cell, or if the UE bars a cell, or the UE is barred to initiate one specific service with the serving cell, the UE may bar the cell for a period of time (e.g., 300 s). The UE may not consider the cell as a candidate cell for cell (re)selection for a period of time (e.g., 300 s).

In the presented implementations, if the UE changes from the SNPN access mode to the PLMN access mode, (the NAS entity of) the UE may release (or delete or discard) the (stored or maintained) list of SNPN ID(s) if any.

In the presented implementations, if the UE changes from the PLMN access mode to the SNPN access mode, (the NAS entity of) the UE may release (or delete or discard) the (stored or maintained) list of PLMN ID(s) if any.

DCI: Downlink Control Information. A DCI may refer to a PDCCH resource with CRC (Cyclic Redundancy Check) scrambled by an RNTI (Radio Network Temporary Identifier). Alternatively, the implementations regarding DCI may be applied for a physical signal.

NR supports RRC_INACTIVE state and UEs with infrequent (periodic and/or non-periodic) data transmissions are generally maintained by the network in the RRC_INACTIVE state. Until Rel-16, the RRC_INACTIVE state doesn't support data transmission. Hence, the UE has to resume the connection (i.e., move to RRC_CONNECTED state) for any DL reception and/or UL data transmission. Connection setup and subsequently release to INACTIVE state happens for each data transmission regardless of how small and infrequent the data packets are. This results in unnecessary power consumption and signaling overhead.

Signaling overhead from (RRC) INACTIVE state UEs due to transmission of small data packets is a general problem and will become a critical issue as the number of UE increases in NR not only for network performance and efficiency but also for the UE battery performance. In general, any device that has intermittent small data packets in INACTIVE state will benefit from enabling SDT in INACTIVE.

The key enablers for SDT in NR, namely the INACTIVE state, 2-step, 4-step RACH and configured grant type-1 have already been specified as part of legacy. So, this work builds on these building blocks to enable SDT in INACTIVE state for NR.

RRC_INACTIVE (i.e., an RRC inactive state) is a state where a UE remains in CM-CONNECTED and can move within an area configured by NG-RAN (the RNA) without notifying NG-RAN. In RRC_INACTIVE, the last serving gNB node (i.e., anchor node to the UE) keeps the UE context and the UE-associated NG connection with the serving AMF and UPF.

RRC_INACTIVE state may support at least of the following functions: PLMN selection, broadcast of system information, cell re-selection mobility, paging initiated by NG-RAN (RAN paging), RAN-based notification area (RNA) managed by NG-RAN, DRX for RAN paging configured by NG-RAN, 5GC-NG-RAN connection (both C/U-planes) established for UE, the UE AS context stored in NG-RAN and the UE, NG-RAN knows the RNA which the UE belongs to, and/or, etc.

For NR connected to 5GC, the UE identity "I-RNTI" may be used to identify the UE context in RRC_INACTIVE. The I-RNTI provides the new NG-RAN node a reference to the UE context in the old NG-RAN node. How the new NG-RAN node is able to resolve the old NG-RAN ID from the I-RNTI is a matter of proper configuration in the old and new NG-RAN node. Some typical partitioning of a 40 bit I-RNTI assumes the following contents:

UE specific reference: reference to the UE context within a logical NG-RAN node;

NG-RAN node address index: information to identify the NG-RAN node that has allocated the UE specific part;

PLMN-specific information: information supporting network sharing deployments, providing an index to the PLMN ID part of the Global NG-RAN node identifier.

SNPN-specific information: SNPN may be a small PLMN configured by the operator. Each SNPN may be identified by a unique SNPN identity (e.g., an identifier of an SNPN comprising of a PLMN ID and an NID combination). A configured grant configuration may be associated with an SNPN ID.

UE Inactive AS Context: UE Inactive AS Context is stored when the connection is suspended (when the UE is in RRC_INACTIVE state) and restored when the connection is resumed (e.g., when the UE is transited from RRC_INACTIVE to RRC_CONNECTED state). In some implementations, (part of) the configured SDT configuration may also be part of the UE Inactive AS Context (or part of the configured SDT configuration may be derived from the UE Inactive AS Context). In some other implementations, (part of) the configured SDT configuration may be independent with the UE Inactive AS Context.

The suspension of the RRC connection is initiated by the network. When the RRC connection is suspended, the UE stores the UE Inactive AS context and any configuration received from the network, and transits to RRC_INACTIVE state. If the UE is configured with SCG, the UE releases or suspend the SCG configuration upon initiating a RRC Connection Resume procedure. The RRC message to suspend the RRC connection is integrity protected and ciphered. The resumption of a suspended RRC connection is initiated by upper layers when the UE needs to transit from RRC_INACTIVE state to RRC_CONNECTED state or by RRC layer to perform a RNA update or by RAN paging from NG-RAN. When the RRC connection is resumed, network configures the UE according to the RRC connection resume procedure based on the stored UE Inactive AS context and any RRC configuration received from the network. The RRC connection resume procedure re-activates AS security and re-establishes SRB(s) and DRB(s).

In response to a request to resume the RRC connection, the network may resume the suspended RRC connection and send UE to RRC_CONNECTED, or reject the request to resume and send UE to RRC_INACTIVE (with a wait timer), or directly re-suspend the RRC connection and send UE to RRC_INACTIVE, or directly release the RRC connection and send UE to RRC_IDLE, or instruct the UE to initiate NAS level recovery (in this case the network sends an RRC setup message).

In addition, in RRC_INACTIVE, a UE specific DRX may be configured by upper layers or by RRC layer, UE controlled mobility is based on network configuration, the UE stores the UE Inactive AS context, and a RAN-based notification area is configured by RRC layer. Furthermore, the UE may perform the following behaviors in an RRC_INACTIVE state:

Monitoring Short Messages transmitted with P-RNTI over DCI;

Monitoring a Paging channel for CN paging using 5G-S-TMSI and RAN paging using full I-RNTI;

Performing neighboring cell measurements and cell (re-) selection;

Performing RAN-based notification area updates periodically and when moving outside the configured RAN-based notification area; and Acquiring system information and can send SI request (if configured).

In the UL, the gNB can dynamically allocate resources to UEs via the C-RNTI on PDCCH(s). A UE always monitors the PDCCH(s) in order to find possible UL grants/DL assignments for uplink transmission/DL reception when its downlink reception is enabled (activity governed by DRX when configured). When CA is configured, the same C-RNTI applies to all serving cells.

In addition, with Configured Grants, the gNB can allocate uplink resources for the initial HARQ transmissions to UEs. Two types of configured uplink grants are defined:

With Type 1, RRC directly provides the configured uplink grant (including the periodicity).

With Type 2, RRC defines the periodicity of the configured uplink grant while PDCCH addressed to CS-RNTI can either signal and activate the configured uplink grant, or deactivate it; i.e. a PDCCH addressed to CS-RNTI indicates that the uplink grant can be implicitly reused according to the periodicity defined by RRC, until deactivated.

Type 1 and Type 2 are configured by RRC per Serving Cell and per BWP. Multiple configurations can be active simultaneously only on different Serving Cells. For Type 2, activation and deactivation are independent among the Serving Cells. For the same Serving Cell, the MAC entity is configured with either Type 1 or Type 2.

RRC configures the following parameters when the configured grant Type 1 is configured:

cs-RNTI: CS-RNTI for retransmission;

periodicity: periodicity of the configured grant Type 1;

timeDomainOffset: Offset of a resource with respect to SFN=0 in the time domain;

timeDomainAllocation: Allocation of configured uplink grant in the time domain which contains startSymbolAndLength (e.g., SLIV in TS 38.214); and nrofHARQ-Processes: the number of HARQ processes for configured grant.

Upon configuration of a configured grant Type 1 for a Serving Cell by upper layers, the MAC entity shall store the uplink grant provided by upper layers as a configured uplink grant for the indicated Serving Cell, and/or initiate or re-initiate the configured uplink grant to start in the symbol according to timeDomainOffset and S (derived from SLIV as specified in TS 38.214), and to reoccur with periodicity.

As for the RA procedure, two types of RA procedures are supported: the 4-step RA type (with MSG1) (e.g., CFRA and/or 4-step CBRA) and the 2-step RA type (with MSGA) (e.g., 2-step CFRA and/or 2-step CBRA).

4-step RA type with MSG1 and 2-step RA type with MSGA are supported. Both types of RA procedure support contention-based random access (CBRA) and contention-free random access (CFRA).

A UE may select the type of RA at initiation of the RA procedure (e.g., for SDT procedure) based on a network configuration.

For example, when CFRA resources are not configured, an RSRP threshold is used by the UE to select between 2-step RA type and 4-step RA type; when CFRA resources for 4-step RA type are configured, UE performs RA with 4-step RA type; when CFRA resources for 2-step RA type are configured, UE performs RA with 2-step RA type.

The network may not configure CFRA resources for 4-step and 2-step RA types at the same time for a Bandwidth Part (BWP). CFRA with 2-step RA type is only supported for handover.

The MSGA of the 2-step RA type includes a preamble on PRACH and a payload on PUSCH. After MSGA transmission, the UE monitors for a response from the network within a configured window. For CFRA, upon receiving the network response, the UE ends the RA procedure. For CBRA, if contention resolution is successful upon receiving the network response, the UE ends the RA procedure; while if fallback indication is received in MSGB, the UE performs MSG3 transmission and monitors contention resolution. If contention resolution is not successful after MSG3 (re)transmission(s), the UE goes back to MSGA transmission.

If the RA procedure with 2-step RA type is not completed after a number of MSGA transmissions, the UE can be configured to switch to CBRA with 4-step RA type.

For RA in a cell configured with SUL, the network can explicitly signal which carrier to use (UL or SUL). Otherwise, the UE selects the SUL carrier if and only if the measured quality of the DL is lower than a broadcast threshold. UE performs carrier selection before selecting between 2-step and 4-step RA type. The RSRP threshold for selecting between 2-step and 4-step RA type can be configured separately for UL and SUL. Once started, all uplink transmissions of the RA procedure remain on the selected carrier.

Based on the 3GPP specification, while the UE wants to initiate an access attempt in one of the events defined in 3GPP specifications (e.g., 3GPP TS 24.501), the UE shall determine one or more access identities from the set of standardized access identities, and one access category from the set of standardized access categories and operator-defined access categories, to be associated with that access attempt. In some implementations, the UE may be configured with specific access identities for SDT procedure. In some other implementations, the UE may re-use one existing access identity as shown in the 3GPP specifications (e.g., 3GPP TS 24.501) for the UAC mechanism of one SDT procedure (e.g., one CG-SDT procedure or one RA-SDT procedure).

Similarly, in some implementations, the UE may be configured with one specific access category for an SDT procedure. In some other implementations, the UE may re-use one existing access category as shown in the 3GPP specifications (e.g., 3GPP TS 24.501) for the UAC mechanism of one SDT procedure (e.g., one CG-SDT procedure or one RA-SDT procedure).

Figure 9:
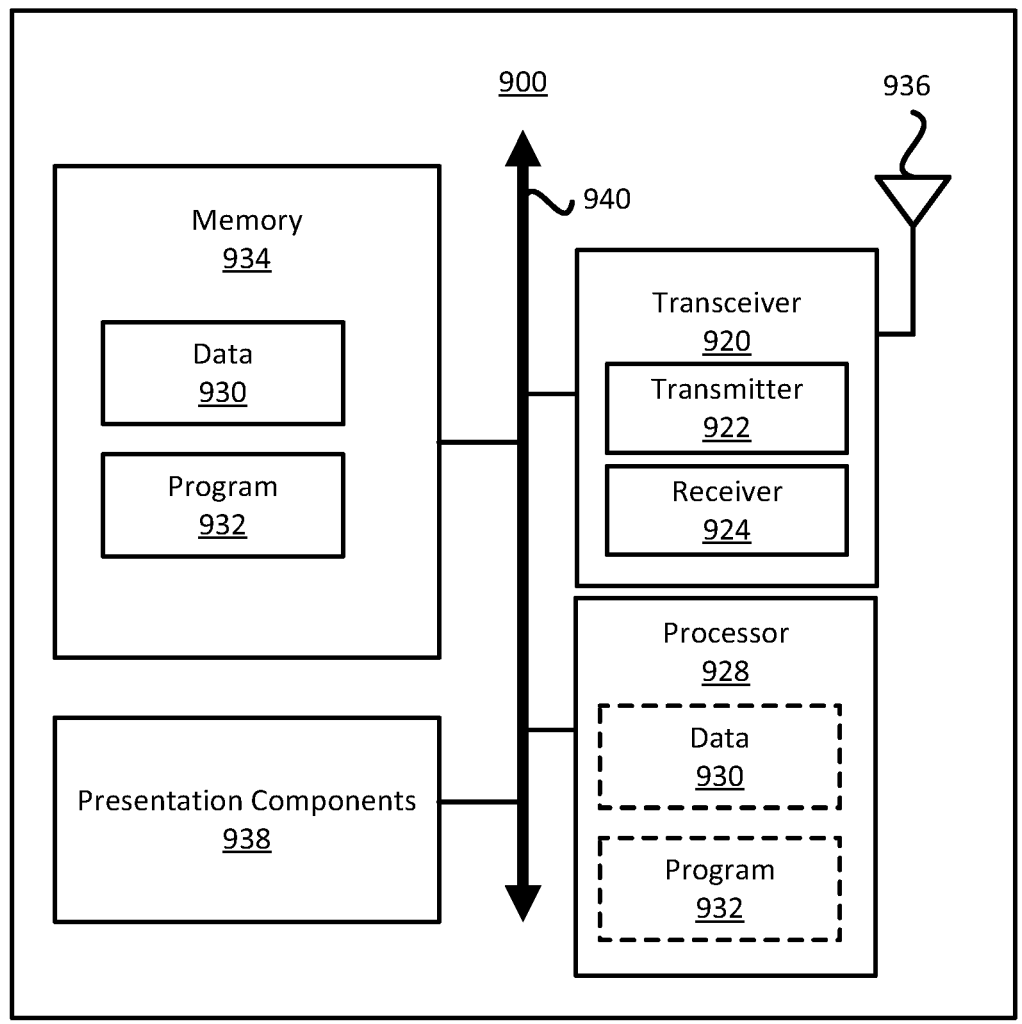
FIG. 9 is a block diagram illustrating a node for wireless communication according to an implementation of the present disclosure.

FIG. 9 is a block diagram illustrating a node 900 for wireless communication according to an implementation of the present disclosure. As illustrated in FIG. 9, a node 900 may include a transceiver 920, a processor 928, a memory 934, one or more presentation components 938, and at least one antenna 936. The node 900 may also include a radio frequency (RF) spectrum band module, a BS communications module, a network communications module, and a system communications management module, Input/Output (I/O) ports, I/O components, and a power supply (not illustrated in FIG. 9).

Each of the components may directly or indirectly communicate with each other over one or more buses 940. The node 900 may be a UE or a BS that performs various functions disclosed with reference to FIGS. 1 through 8.

The transceiver 920 has a transmitter 922 (e.g., transmitting/transmission circuitry) and a receiver 924 (e.g., receiving/reception circuitry) and may be configured to transmit and/or receive time and/or frequency resource partitioning information. The transceiver 920 may be configured to transmit in different types of subframes and slots including but not limited to usable, non-usable and flexibly usable subframes and slot formats. The transceiver 920 may be configured to receive data and control channels.

The node 900 may include a variety of computer-readable media. Computer-readable media may be any available media that may be accessed by the node 900 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 934 may include computer-storage media in the form of volatile and/or non-volatile memory. The memory 934 may be removable, non-removable, or a combination thereof. Example memory may include solid-state memory, hard drives, optical-disc drives, etc. As illustrated in FIG. 9, the memory 934 may store a computer-readable and/or computer-executable program 932 (e.g., software codes or a set of instructions) that are configured to, when executed, cause the processor 928 to perform various functions disclosed herein, for example, with reference to FIGS. 1 through 8. Alternatively, the program 932 may not be directly executable by the processor 928 but may be configured to cause the node 900 (e.g., when compiled and executed) to perform various functions disclosed herein.

The processor 928 (e.g., having processing circuitry) may include an intelligent hardware device, e.g., a Central Processing Unit (CPU), a microcontroller, an ASIC, etc. The processor 928 may include memory. The processor 928 may process the data 930 and the program 932 received from the memory 938, and information transmitted and received via the transceiver 920, the base band communications module, and/or the network communications module. The processor 928 may also process information to send to the transceiver 920 for transmission via the antenna 936 to the network communications module for transmission to a CN.

One or more presentation components 938 may present data indications to a person or another device. Examples of presentation components 938 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A method performed by a User Equipment (UE) for access control, the method comprising:
  receiving a radio resource configuration from a serving cell, and
  after initiating an uplink (UL) data transmission procedure with the serving cell while the UE is in a Radio Resource Control (RRC) Inactive state,
  transmitting one or more UL packets to the serving cell based on the radio resource configuration when a plurality of conditions is fulfilled, the plurality of conditions comprising, at least:
  an access attempt for transmitting UL data while the UE is in the RRC Inactive state not being barred by the serving cell, and
  an amount of pending UL data to be transmitted being less than or equal to a data volume threshold.

2. The method of claim 1, wherein the UL data transmission procedure is a random access (RA) procedure initiated by the UE based on the radio resource configuration.

3. The method of claim 1, wherein the UL data transmission procedure comprises:
  accessing at least one UL-configured grant (UL-CG) based on a UL-CG configuration pre-configured by the serving cell via UE-specific control signaling.

4. The method of claim 3, further comprising:
  determining whether to access the at least one UL-CG for the UL data transmission procedure based on the data volume threshold; and
  determining whether to initiate a Random Access (RA) procedure for the UL data transmission procedure based on the data volume threshold.

5. The method of claim 1, wherein:
  the access attempt for transmitting the UL data is barred in a case that
    the UE receives, from the serving cell, system information comprising a cell-barred bit that indicates the serving cell is barred, or
    the serving cell is barred during a barring time period determined by the UE based on a result of a unified access control (UAC) mechanism.

6. The method of claim 5, wherein the UAC mechanism is implemented by the UE for the UL data transmission procedure based on an access category associated with the UL data transmission procedure.

7. The method of claim 5, further comprising:
  determining the barring time period for a previous access attempt with the serving cell, wherein:
  the previous access attempt occurs earlier than an access attempt of the UE to initiate the UL data transmission procedure, and
  the previous access attempt and the access attempt of the UE to initiate the UL data transmission procedure belong to a same access category in the UAC mechanism.

8. The method of claim 5, further comprising:
  forgoing performing another UAC mechanism for the access attempt of the UL data transmission procedure until the barring time period elapses.

9. The method of claim 1, further comprising:
  receiving the data volume threshold via UE-specific RRC signaling or via broadcasting system information.

10. The method of claim 1, further comprising:
  determining the amount of pending UL data by considering pending data in all of a plurality of logical channels allowed by the serving cell for the UL data transmission while the UE is in the RRC Inactive state.

11. A User Equipment (UE) for access control, the UE comprising:
  at least one processor; and
  at least one non-transitory computer-readable medium coupled to the at least one processor and storing one or more computer-executable instructions that, when executed by the at least one processor, cause the UE to:
  receive a radio resource configuration from a serving cell; and
  after initiating an uplink (UL) data transmission procedure with the serving cell while the UE is in a Radio Resource Control (RRC) Inactive state,
  transmit one or more UL packets to the serving cell based on the radio resource configuration when a plurality of conditions is fulfilled, the plurality of conditions comprising:
  an access attempt for transmitting UL data while the UE is in the RRC Inactive state not being barred by the serving cell, and
  an amount of pending UL data to be transmitted being less than or equal to a data volume threshold.

12. The UE of claim 11, wherein the UL data transmission procedure is a random access (RA) procedure initiated by the UE based on the radio resource configuration.

13. The UE of claim 11, wherein the one or more computer-executable instructions, when executed by the at least one processor, further cause the UE to:
  in the UL data transmission procedure, access at least one UL-configured grant (UL-CG) based on a UL-CG configuration pre-configured by the serving cell via UE-specific control signaling.

14. The UE of claim 13, wherein the one or more computer-executable instructions, when executed by the at least one processor, further cause the UE to:
  determine whether to access the at least one UL-CG for the UL data transmission procedure based on the data volume threshold; and determine whether to initiate a Random Access (RA) procedure for the UL data transmission procedure based on the data volume threshold.

15. The UE of claim 11, wherein:
the access attempt for transmitting the UL data is barred in a case that
the UE receives, from the serving cell, system information comprising a cell-barred bit that indicates the serving cell is barred, or
the serving cell is barred during a barring time period determined by the UE based on a result of a unified access control (UAC) mechanism.

16. The UE of claim 15, wherein the UAC mechanism is implemented by the UE for the UL data transmission procedure based on an access category associated with the UL data transmission procedure.

17. The UE of claim 15, wherein the one or more computer-executable instructions, when executed by the at least one processor, further cause the UE to:
determine the barring time period for a previous access attempt with the serving cell, wherein:
the previous access attempt occurs earlier than an access attempt of the UE to initiate the UL data transmission procedure, and
the previous access attempt and the access attempt of the UE to initiate the UL data transmission procedure belong to a same access category in the UAC mechanism.

18. The UE of claim 15, wherein the one or more computer-executable instructions, when executed by the at least one processor, further cause the UE to:
forgo performing another UAC mechanism for the access attempt of the UL data transmission procedure until the barring time period elapses.

19. The UE of claim 11, wherein the one or more computer-executable instructions, when executed by the at least one processor, further cause the UE to:
receive the data volume threshold via UE-specific RRC signaling or via broadcasting system information.

20. The UE of claim 11, wherein the one or more computer-executable instructions, when executed by the at least one processor, further cause the UE to:
determine the amount of pending UL data by considering pending data in all of a plurality of logical channels allowed by the serving cell for the UL data transmission while the UE is in the RRC Inactive state.

* * * * *